(12) United States Patent
Vanam et al.

(10) Patent No.: US 9,191,671 B2
(45) Date of Patent: Nov. 17, 2015

(54) SYSTEM AND METHOD FOR ERROR-RESILIENT VIDEO CODING

(71) Applicant: Vid Scale, Inc., Wilmington, DE (US)

(72) Inventors: Rahul Vanam, San Diego, CA (US); Zhifeng Chen, San Diego, CA (US); Yuriy Reznik, San Diego, CA (US)

(73) Assignee: VID SCALE, INC., Wilmington, DE (US)

( * ) Notice: Subject to any disclaimer, the term of this patent is extended or adjusted under 35 U.S.C. 154(b) by 211 days.

(21) Appl. No.: 13/835,925

(22) Filed: Mar. 15, 2013

(65) Prior Publication Data

US 2013/0279606 A1 Oct. 24, 2013

Related U.S. Application Data

(60) Provisional application No. 61/635,846, filed on Apr. 19, 2012.

(51) Int. Cl.
| | | |
|---|---|---|
| *H04N 7/12* | (2006.01) | |
| *H04N 11/02* | (2006.01) | |
| *H04N 11/04* | (2006.01) | |
| *H04N 19/65* | (2014.01) | |
| *H04N 19/172* | (2014.01) | |
| *H04N 19/102* | (2014.01) | |
| *H04N 19/164* | (2014.01) | |
| *H04N 19/166* | (2014.01) | |
| *H04N 19/39* | (2014.01) | |
| *H04N 19/89* | (2014.01) | |
| *H04N 19/587* | (2014.01) | |

(52) U.S. Cl.
CPC ....... *H04N 19/00854* (2013.01); *H04N 19/102* (2014.11); *H04N 19/164* (2014.11); *H04N 19/166* (2014.11); *H04N 19/172* (2014.11); *H04N 19/39* (2014.11); *H04N 19/587* (2014.11); *H04N 19/65* (2014.11); *H04N 19/89* (2014.11)

(58) Field of Classification Search
None
See application file for complete search history.

(56) References Cited

U.S. PATENT DOCUMENTS

| 6,046,777 | A * | 4/2000 | Patton et al. .................. 348/565 |
| 8,073,049 | B2 | 12/2011 | Kozica |
| 2010/0033622 | A1 | 2/2010 | Bellers et al. |

FOREIGN PATENT DOCUMENTS

| WO | WO-01/22735 | 3/2001 |
| WO | WO-2004/025964 | 3/2004 |

OTHER PUBLICATIONS

"Video Back-Channel Messages for Conveyance of Status Information and Requests from a Video Receiver to a Video Sender", ITU-T Telecommunication Standardization Sector of ITU; H.271; Series H: Audiovisual and Multimedia Systems; Infrastructure of Audiovisual Services-Coding of Moving Video, May 2006, 22 Pages.

(Continued)

*Primary Examiner* — Kate Luo
(74) *Attorney, Agent, or Firm* — Theodore Naccarella

(57) ABSTRACT

Error resilient video coding schemes that may be employed at a transmitter or transcoder to limit error propagation at the receiver. Embodiments may include the use of Inhomogeneous Temporal Multiple Description Coding (ITMDC), cross-description error concealment, and cross-description reference picture reset (RPS) as well as homogeneous and inhomogeneous temporal/spatial MDC.

13 Claims, 28 Drawing Sheets

(56) References Cited

OTHER PUBLICATIONS

Bernardini, R., et al., "Polyphase Spatial Subsampling Multiple Description Coding of Video Streams with H264", 2004 International Conference on Image Processing (ICIP), Oct. 2004, 4 Pages.

Devadoss, J., et al., "Evaluation of Error Resilience Mechanisms for 3G Conversational Video", IEEE Intl Symposium on Multimedia, Dec. 2008, 6 Pages.

Fukunaga, S., et al., "Error Resilient Video Coding by Dynamic Replacing of Reference Pictures", Kansai Lab., R&D Group, Oki Electric Ind. Co., Ltd.; 1-2-27 Shiromi, Chuo-ku, Osaka 540, Japan, 1996, 6 Pages.

Girod, B., et al., "Feedback-Based Error Control for Mobile Video Transmission", Proc. of IEEE, vol. 97, pp. 1707-1723, Oct. 1999, 17 Pages.

Goyal, Vivek K., "Multiple Description Coding: Compression Meets the Network", IEEE Signal Processing Magazine, Sep. 2001, 20 Pages.

Kumar, S., et al., "Error Resiliency Schemes in H.264/AVC Standard", Elsevier J. of Visual Communication and Image Representation (Special Issue on Emerging H.264/AVC Video Coding Standard), vol. 17(c), Apr. 2006, 26 Pages.

Liu, Xianming, et al., "Low Bit-Rate Video Coding Via Mode-Dependent Adaptive Regression for Wireless Visual Communications", School of Computer Science and Technology, Harbin Insitute of Technology, Harbin, China; ECE Department, McMaster University, Ontario Canada, L8S 4K1; School of Electronic Engineering and Computer Science, Peking University, Beijing, China, Nov. 2012, 6 Pages.

Ott, J., et al., "Extended RTP Profile for Real-Time Transport Control Protocol (RTCP)-Based Feedback (RTP/AVPF)", Network Working Group; Request for Comments: 4585; Category: Standards Track, Jul. 2006, 48 Pages.

Richardson, Iain E., "H.264 and MPEG-4 Video Compression: Video Coding for Next Generation", Vcodex Limited, UK, Second Edition; A John Wiley and Sons, Ltd., Publication, 2004, 349 Pages.

Schulzrinne, H., et al., "RTP: A Transport Protocol for Real-Time Applications", Network Working Group; Request for Comments: 3550; Obsoletes: 1889; Category: Standards Track; http://tools.ietf.org/html/rfc3550, Jul. 2003, 104 Pages.

Sjoberg, Rickard, et al., "Absolute Signaling of Reference Pictures", Joint Collaborative Team on Video Coding (JCT-VC) of ITU-T SG16 WP3 and ISO/IEC JTC1/SC29/WG11; 6th Meeting: Tornino 2011: JCTVC-F493, 2011, 10 Pages.

Tu, W., et al., "Proxy-Based Reference Picture Selection for Error Resilient Conversational Video in Mobile Networks", IEEE Transactions on Circuits and Systems for Video Technology, vol. 19, No. 2, Feb. 2009, 14 Pages.

Wenger, S., "H.264/AVC Over IP", IEEE Transactions on Circuits and Systems for Video Technology, vol. 13, No. 7, Jul. 2003, 12 Pages.

Conklin, G. J., et al., "Video Coding for Streaming Media Delivery on the Internet", IEEE Trans. Circuits Syst. Video Technology, 2001, vol. 11, No. 3, pp. 20-34.

"Notification of Transmittal of the International Search Report and Written Opinion of the International Search Authority, or the Declaration", Form PCT/ISA/220; PCT/US2013/032158, Sep. 11, 2013, 19 pages.

Bai, Huihui, et al., "Multiple Description Video Coding Using Adaptive Temporal Sub-Sampling", Multimedia and Expo, 2007 IEEE; ISBN: 978-1-4244-1016-3; Section 2; Figures 1-3, Jul. 1, 2007, 4 pages.

Kim, Young G., et al., "Network-Aware Error Control Using Smooth and Fast Rate Adaption Mechanism for TCP-friendly Internet Video", Computer Communications and Networks, 2000; Ninth International Conference in Las Vegas, NV; pp. 320-325; Xp010524526; ISBN: 978-0-7803-6494-3; section II.B; Figure 5, 2000, 6 pages.

Lee, Jin Y., et al., "Interleaved Source Coding (ISC) for Predictive Video Coded Frames Over the Internet", Communications, 2005. ICC 2005, IEEE International Conference in Seoul, Korea; vol. 2, pp. 1224-1228; XP010825482; ISBN: 978-0-7803-8938-0, 2005, 5 pages.

Lin, Shunan, et al., "A Reference Picture Selection Scheme for Video Transmission Over Ad-Hoc Networks Using Multiple Paths", Department of Electrical Engineering, Polytechnic University 6 Metrotech, Brooklyn, NY 11201, USA; 2001 IEEEE International Conference on Multimedia and Expo, 2001, 4 pages.

Lu, Yang, et al., "Bi-Directional Entire Frame Recovery in MDC Video Streaming", International Symposium on Communications and Information Technologies; IEEE CAT. No. 05EX1224; Oct. 12, 2005; ISBN: 978-0-7803-9538-1, Oct. 12, 2005, 4 pages.

Nazir, Sajid, et al., "Relay-assisted Rateless layered Multiple Description Video Delivery", Feb. 2, 2012, 24 pages.

Vanam, Rahul, et al., "Error Resilient Video Coding for Systems With Delayed Feedback", InterDigital Communications, LLC, Nov. 27, 2012, 6 pages.

Vanam, Rahul, et al., "Error-resilient Video Coding for Wireless Video Telephony Applications", Visual Communications and Image Processing (VCIP); XP032309214; ISBN: 978-1-4673-4405-0, Nov. 27, 2012, 9 pages.

Wang, Yao, "Error Resilient Video Coding Techniques", IEEE Signal Processing Magazine, Jul. 2000, 22 pages.

\* cited by examiner

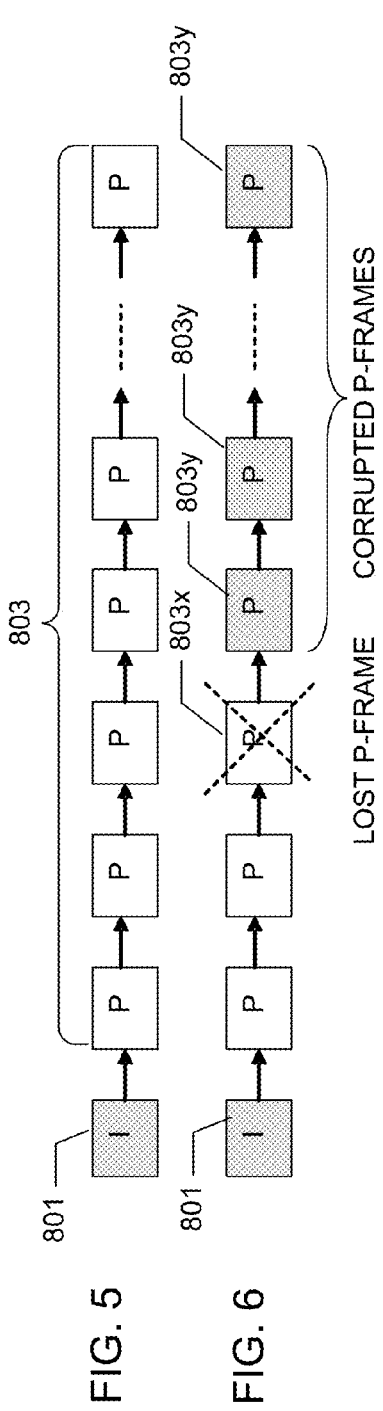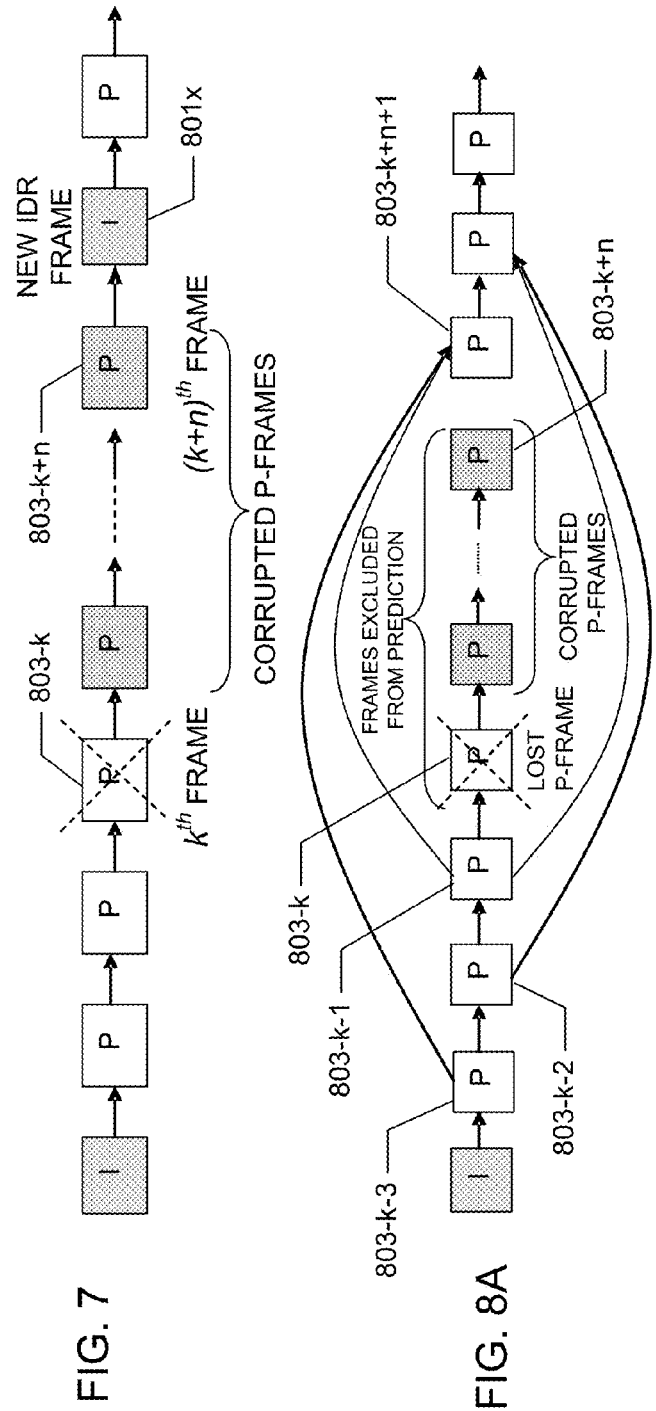

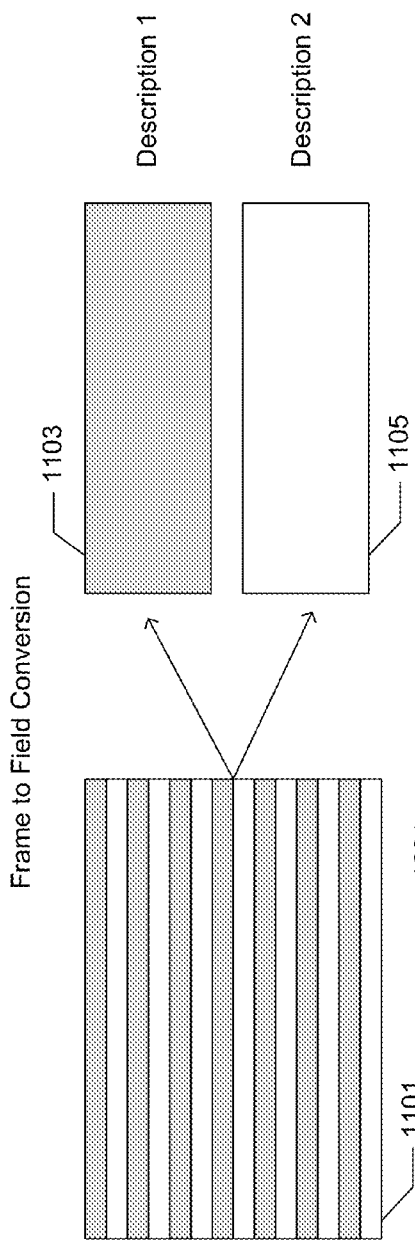

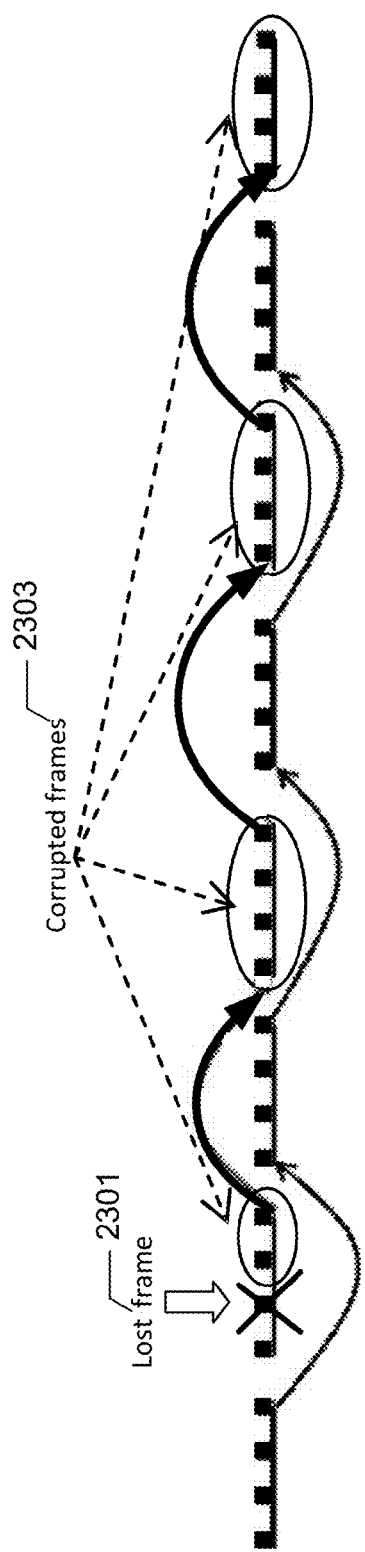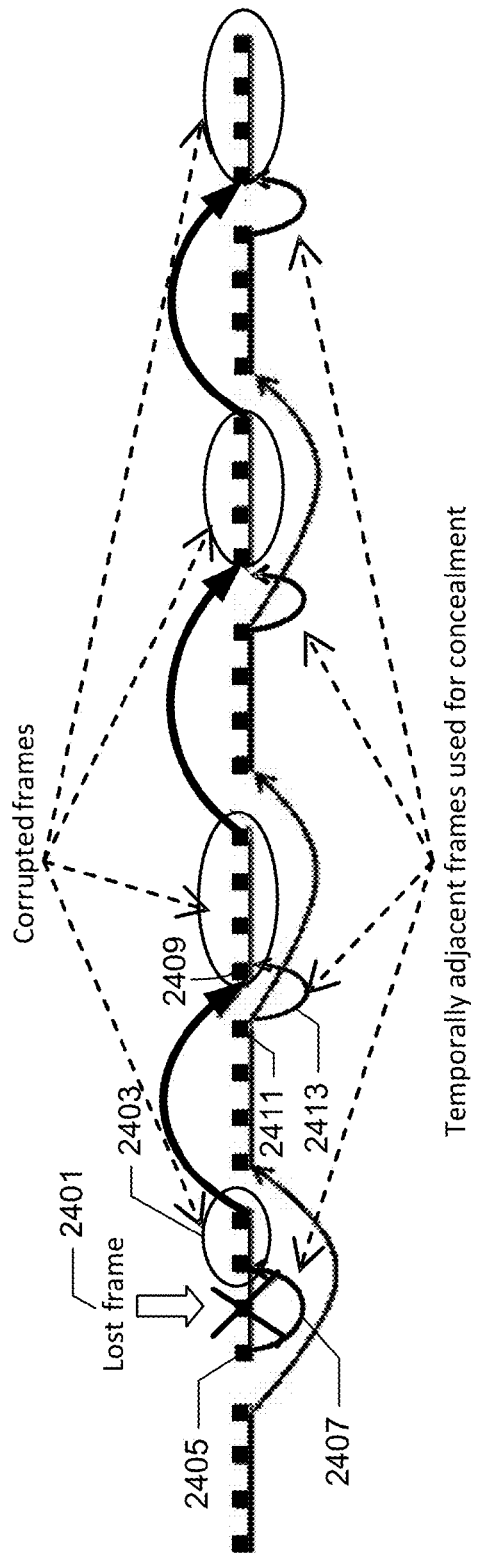

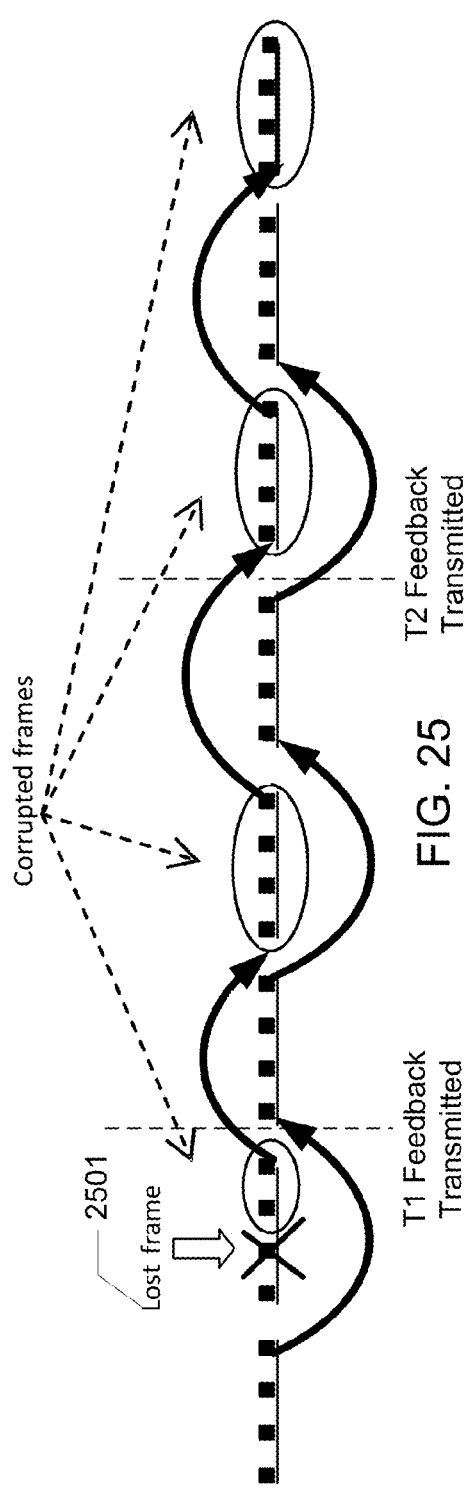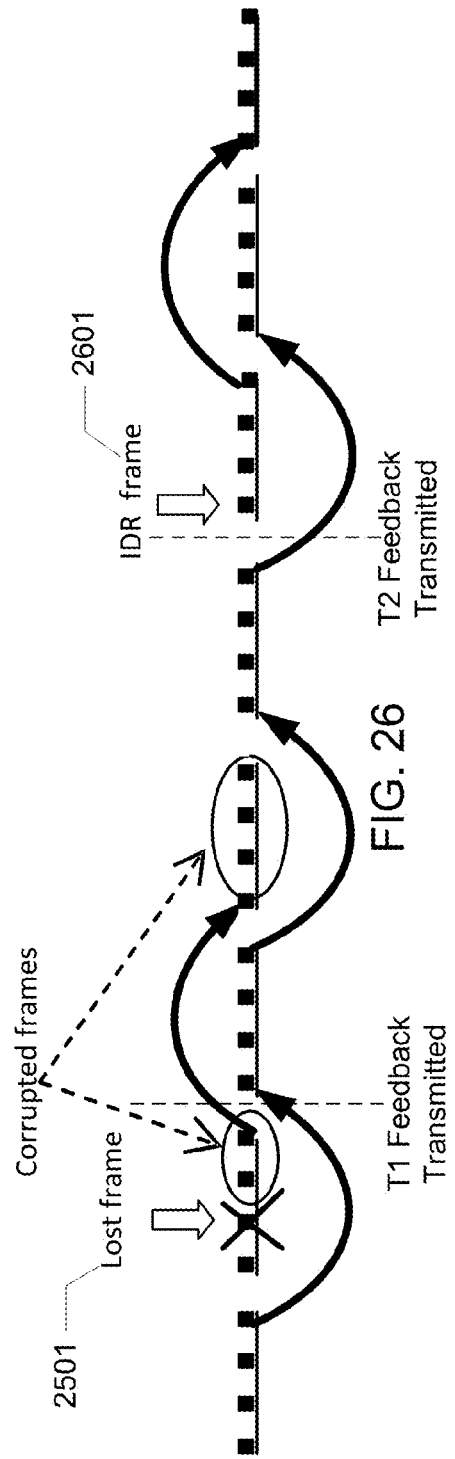

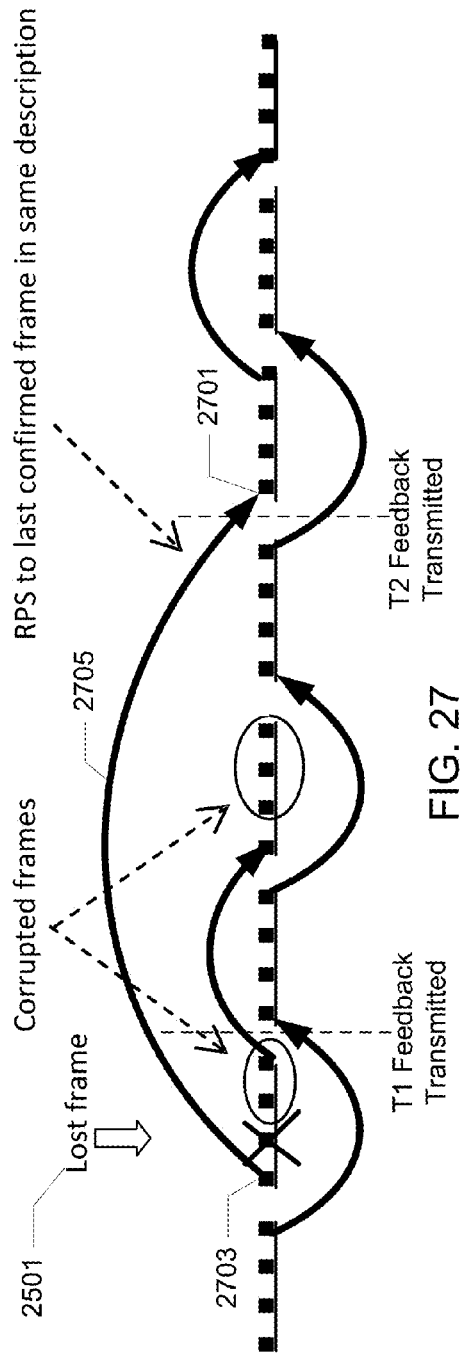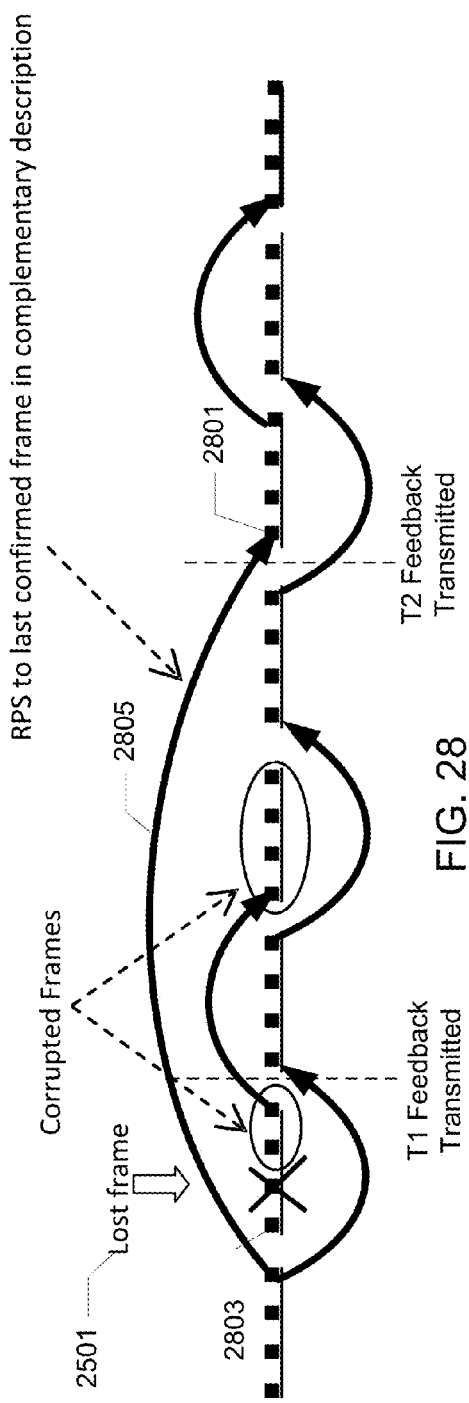

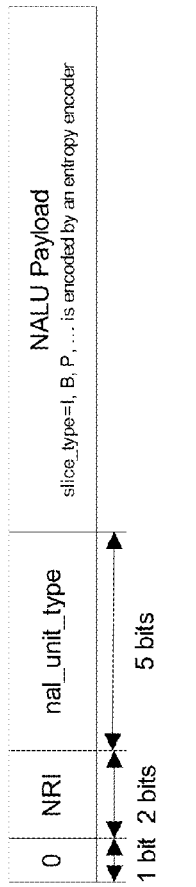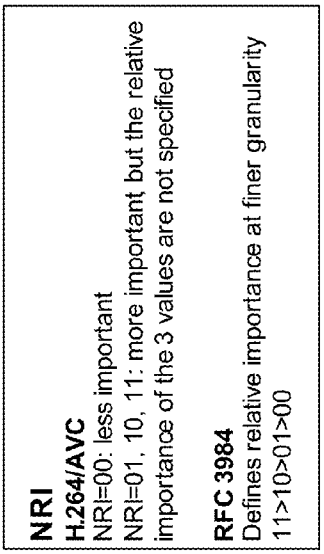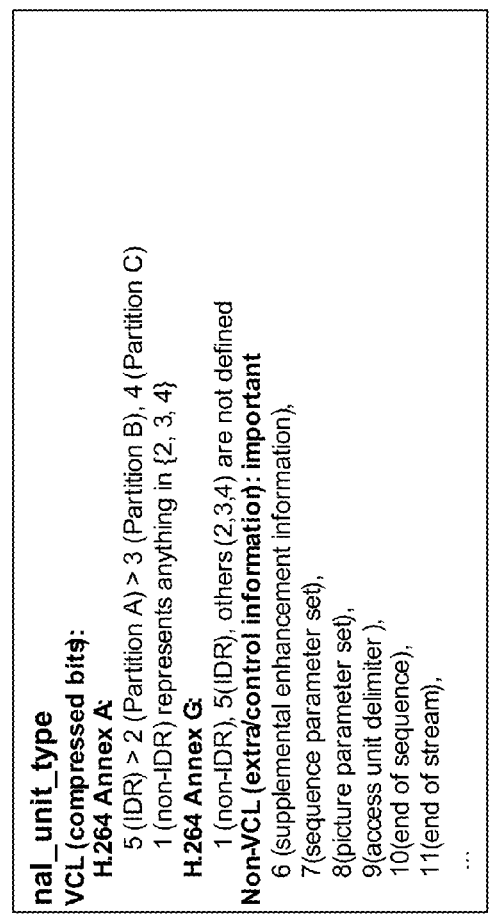
FIG. 48

SYSTEM AND METHOD FOR ERROR-RESILIENT VIDEO CODING

BACKGROUND

In recent years, demand for mobile wireless video has steadily increased, and its growth is predicted to increase with the new infrastructure of the LTE/LTE advanced network that offers significantly higher user data rates. Although present-day wireless networks have increased capacity, and smart phones are now capable of generating and displaying video, actually transporting video across these advanced wireless communication networks has become challenging. Furthermore, video transmitted using non-guaranteed delivery transports, such as UDP or RTP is vulnerable to packet loss, especially in a wireless environment. Due to the predictive nature of video coding, artifacts resulting from packet loss can propagate through significant length of the video, thereby degrading video quality.

SUMMARY

Described herein are error resilient video coding schemes that may be employed at a transmitter or transcoder to limit error propagation at the receiver. A number of embodiments of video coding methods having improved error-resilience are provided. These include the use of Inhomogeneous Temporal Multiple Description Coding (ITMDC), cross-description error concealment, and cross-description reference picture reset (RPS). Cross-description reference picture reset may be used as a tool for stopping error propagation in systems employing delayed feedback.

In one embodiment, a method may comprise encoding video data using inhomogeneous temporal Multiple Description Coding (IHTMDC). In further embodiments, the method may include using temporal distances between adjacent frames in a description that are unequal. The encoding method of some embodiments may be characterized by an interleaving interval, k, and, in some embodiments, the interleave factor is in the range of k=3 to 8. Further, the interleave parameter k may be varied by the encoder. In still further embodiments, the encoding scheme uses error concealment and feedback-based error correction. In a further embodiment, the method may include sub-sampling input video to generate two videos having different frames; encoding each of the two videos using an instance of an H.264 encoder to generate two descriptions; and, transmitting video packets of the two descriptions by either (i) transmitting each description over a separate RTP channel, or (ii) transmitting packets corresponding to both descriptions over the same RTP channel.

A method of one embodiment may comprise using a video encoding interleaving interval and a sequence number of an RTP packet to map each one of a plurality of packets to a respective one of a plurality of descriptions. A further method may comprise receiving a plurality of video descriptions, decoding each description, and multiplexing the decoded descriptions to generate an output video; and, when only one description is received, upsampling the decoded video to a higher frame rate using a frame rate up-convertor to generate an output video.

A method of another embodiment may comprise sub-sampling input video, the input video comprising a plurality of sequential frames, to generate at least first and second video streams, each stream comprising different frames of the input video, and encoding each of the at least first and second video streams to generate at least first and second video descriptions, wherein the frames contained in at least one of the video streams comprises temporally inhomogeneous frames of the input video.

A method of another embodiment may comprise multiple description coding (MDC) video decoding method comprising receiving at least first and second video descriptions, each description comprising different temporal portions of an input video, wherein the frames contained in at least one of the descriptions comprises temporally inhomogeneous temporal portions of the input video, decoding the at least first and second descriptions, and when the at least first and second descriptions are received correctly, multiplexing the at least first and second descriptions to create a reproduction of the input video.

Yet another embodiment may comprise a method for encoding video data comprising temporally and spatially sub-sampling input video data to produce at least first, second, third, and fourth temporally and spatially sub-sampled video streams, and encoding each of the first, second, third, and fourth video streams to produce first, second, third, and fourth video descriptions.

Yet another embodiment may comprise a method for decoding video data comprising receiving first, second, third, and fourth temporally and spatially sub-sampled video descriptions of an input video, and decoding the first, second, third, and fourth video streams to produce first, second, third, and fourth video descriptions, and when the first, second, third, and fourth descriptions are received correctly, multiplexing the first, second, third, and fourth descriptions to create a reproduction of the input video.

BRIEF DESCRIPTION OF THE DRAWINGS

A more detailed understanding may be had from the following description, given by way of example in conjunction with the accompanying drawings wherein:

FIG. 5 depicts an IPPP encoding structure;

FIG. 6 illustrates an IPPP encoding structure with one frame lost during transmission;

FIG. 7 illustrates an intra refresh method for prevention of error propagation;

FIG. 8A illustrates one form of error propagation reduction in a predictive video stream;

FIG. 11 is a pictorial illustration demonstrating Spatial MDC using each interlaced field as a description;

FIG. 12 is a pictorial illustration demonstrating quincunx sampling;

FIG. 23 is a pictorial representation of a prediction structure of Inhomogeneous temporal MDC having two descriptions and k=4, where one frame is lost during transmission;

FIG. 24 is a pictorial representation of an embodiment where adjacent temporal frames from both descriptions may be used for error concealment;

FIG. 25 is a pictorial representation illustrating error detection and notification with delayed feedback;

FIG. 26 is a pictorial representation illustrating Intra/IDR refresh with IHTMDC;

FIG. 27 is a pictorial representation illustrating the use of RPS within the same description in IHTMDC;

FIG. 28 is a pictorial representation illustrating the use of RPS to reference a complementary description in IHTMDC;

DETAILED DESCRIPTION

Disclosed herein are methods and systems that may be used to reduce error propagation in encoded video. They may be used with systems having RTP-type transport protocols and employing delayed RTCP-type feedback. The techniques belong to the domain of "network-aware video coding", where awareness of the network is reduced to the information accessible by means of Real-Time Transport Protocol (RTP) and Real-Time Transport Control Protocol (RTCP).

Figure 1:
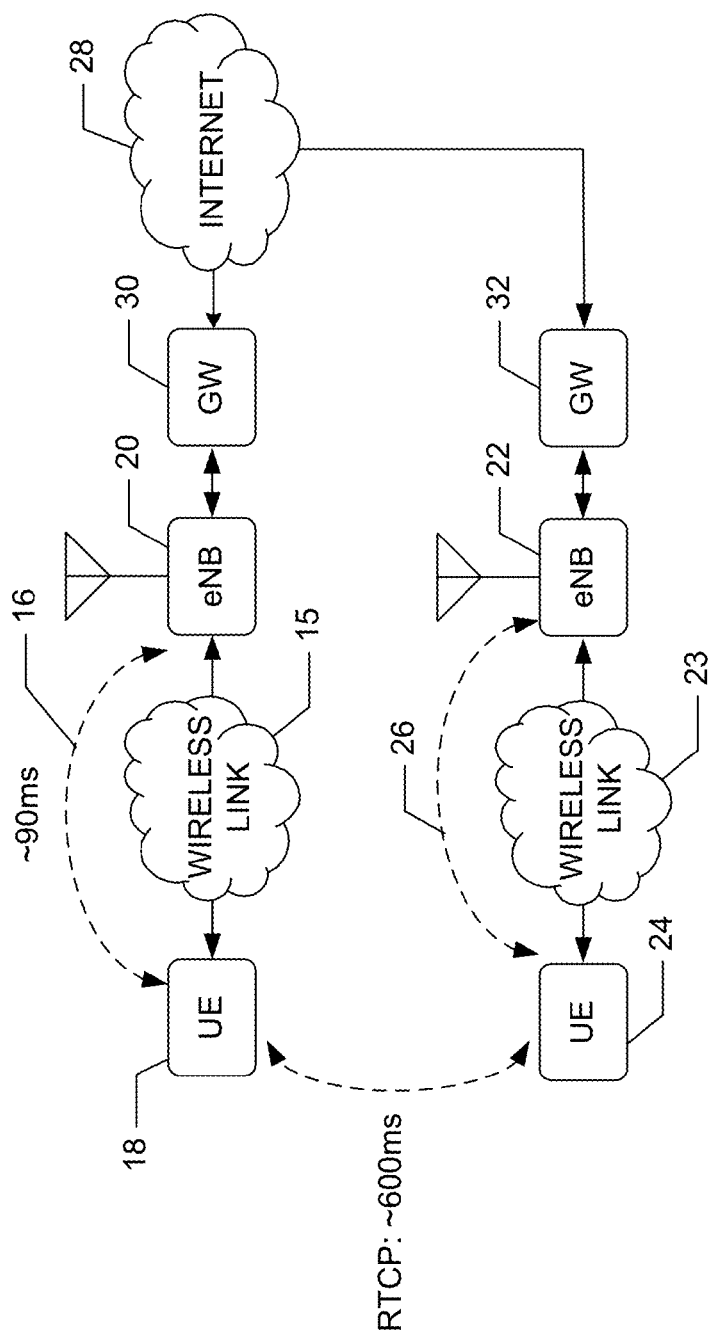
FIG. 1 is an example of a mobile video telephony and video streaming system showing communication links and feedback loops.

FIG. 1 depicts an architecture of a mobile video telephony system. In this example, RTP transport is employed to carry packets of video and audio information, and RTCP protocol [1, 2] is employed to control this communication. Other protocols and/or additional protocols may also be used. Transmission of video from a sending UE 18 to a receiving UE 24 involves several communication links. The first or "local" link is a wireless link 15 between a phone (UE) 18 and the base station (eNB) 20. In modern wireless systems, such as LTE, the delay of transmission of a packet between the UE and the base station is bounded, and for real-time/VOIP traffic is usually around 90 ms (it could be as large as 150 ms for other traffic classes). The packet may be successfully transmitted or lost at the local link 15. A similar delay (and similar possibility of packet loss) is involved in transmission of a packet from the "remote" eNB 22 to UE 24 over "remote" wireless link 26. Between the two eNBs 20 and 22, the packets may pass from the eNB 20 to a gateway node 30, through the internet 28, to another gateway node 32 and then to eNB 22.

When a packet is lost (e.g., at the local link 15, in the Internet 28, or at the remote wireless link 26 through remote network 23), this loss is eventually noticed by user B's application, and communicated back to user A by means of an RTCP receiver report (RR). In practice, such error notification reports usually are sent periodically, but infrequently, e.g., at about 600 ms—1 s intervals. When an error notification reaches the sender (application of user A), it can be used to direct the video encoder to insert an Intra (or IDR) frame, or use other codec-level means to stop error propagation at the decoder. However, the longer the delay between the packet loss and receiver report, the more frames of the video sequence will be affected by the error. In practice, video decoders usually employ so-called error concealment (EC) techniques, but even with state-of-art concealment, a one-second delay before refresh can cause significant and visible artifacts (so-called "ghosting").

The data transmission model for video transmission over wireless networks will be described in terms of RTP/RTCP transport and an LTE protocol stack, although the systems and methods described herein also may be applied to other transport and link-layer protocols as well.

Figure 2:
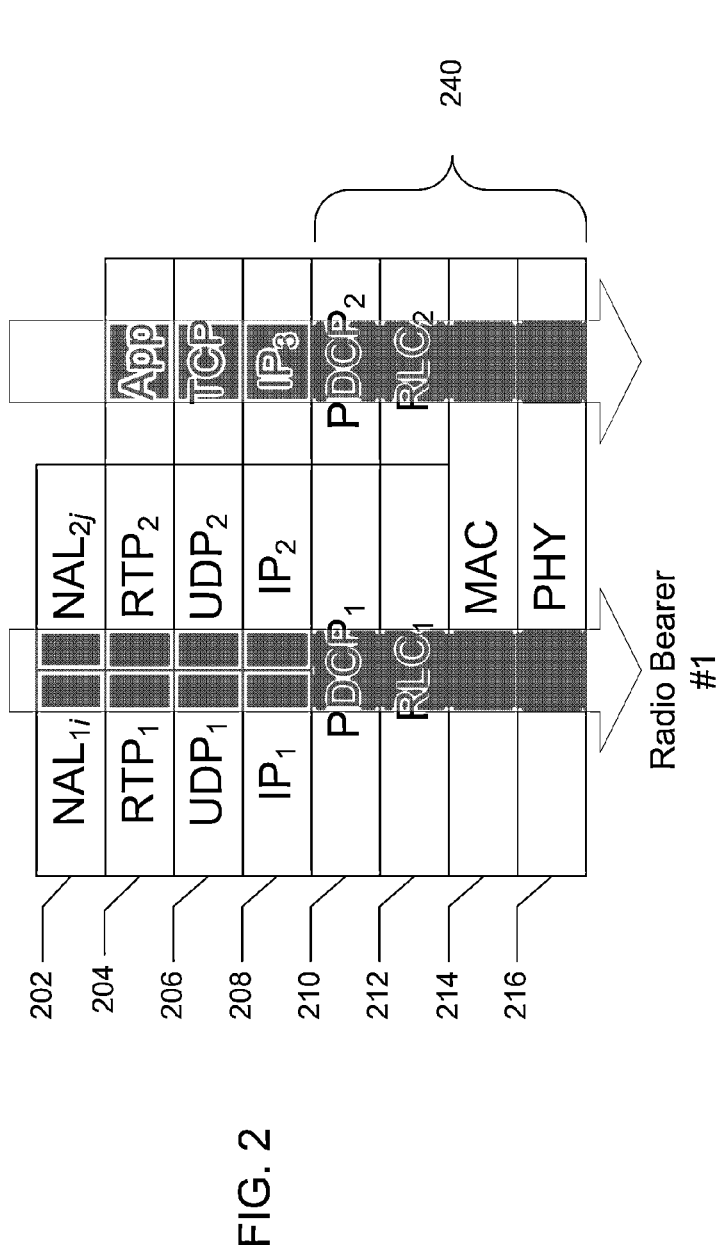
FIG. 2 is an example protocol stack and transmission model.

FIG. 1 depicts both wired and wireless communication links utilized by such a system, as well as possible feedback loops. An example of a stack of layers and protocols involved in transmission of video data at the wireless links is shown in FIG. 2, where video data, initially packaged in Network Abstraction Layer (NAL) 202 units 203, are carried using a transport protocol, such as Real-time Transport Protocol (RTP) 204. In the simplest case, each NAL unit 203 is embedded into the payload of a single RTP packet 205. More generally, NAL units 203 may be split and carried as multiple RTP packets 205 or aggregated and transmitted in multiple quantities within a single RTP packet. In turn, RTP packets may be embedded into UDP layer 206 packets 207, which in turn, are embedded in and carried through the system as IP layer 208 packets 209. An application 222 may also use TCP 224 for sending session-related information or types of data that have to be delivered in bit-exact form. As shown in FIG. 2, the LTE data plane 240 includes four sub-layers: PDCP 210, RLC 212, MAC 214, and PHY 216. They are present at both the eNodeB and the UE.

Table 1 shows the input and output forms of different layers in RTP transport layer and LTE stack. A loss of a packet in one of the lower layers corresponds to a loss of an associated packet in the application layer. For example, when a PDCP PDU is lost, its associated NAL unit also is considered lost.

TABLE 1

Input and output of different protocol layers.

| Protocol layer/sublayer | Input | Output |
| --- | --- | --- |
| Application (video encoder) | NAL packet | RTP packet |
| UDP | RTP packet | UDP packet |
| IP | UDP packet | IP packet |
| PDCP | IP packets | PDCP PDU |
| RLC | PDCP PDU | RLC PDU |

Figure 3:
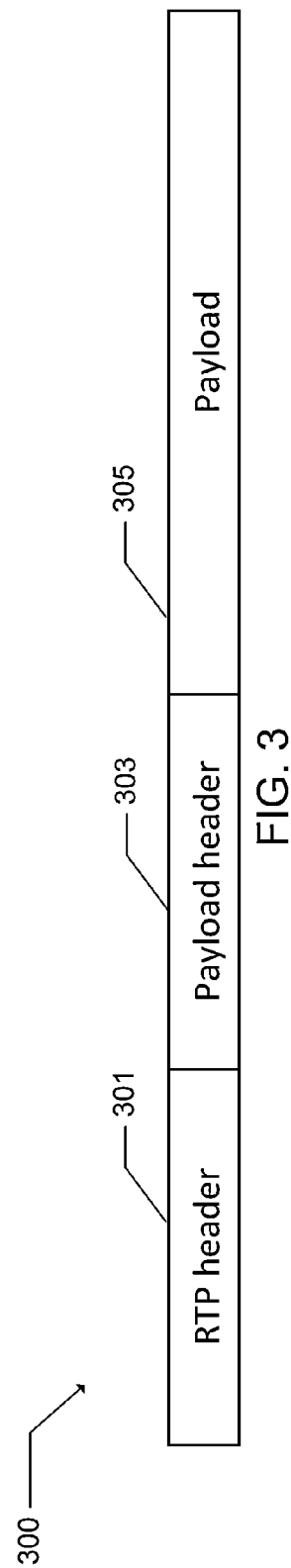
FIG. 3 depicts the structure of an RTP packet.

The Real-Time Transport Protocol (RTP) is specified by the IETF: RFC 3550 [1]. RTP provides a means of transporting real-time streams over internet protocol (IP) networks. RTP is a session-oriented protocol, in which a session is associated with a transport address, which comprises an IP address and a UDP port number. Referring to FIG. 3, an RTP packet 300 comprises an RTP header 301, an optional payload header 303, and payload 305. The payload, for instance, may be an H.264 NAL unit, which could correspond to a frame, slice, or group of slices. More generally, however, RTP may fragment a single NAL unit into payloads sent over multiple RTP packets, or aggregate multiple NAL packets into a single RTP packet.

Figure 4:
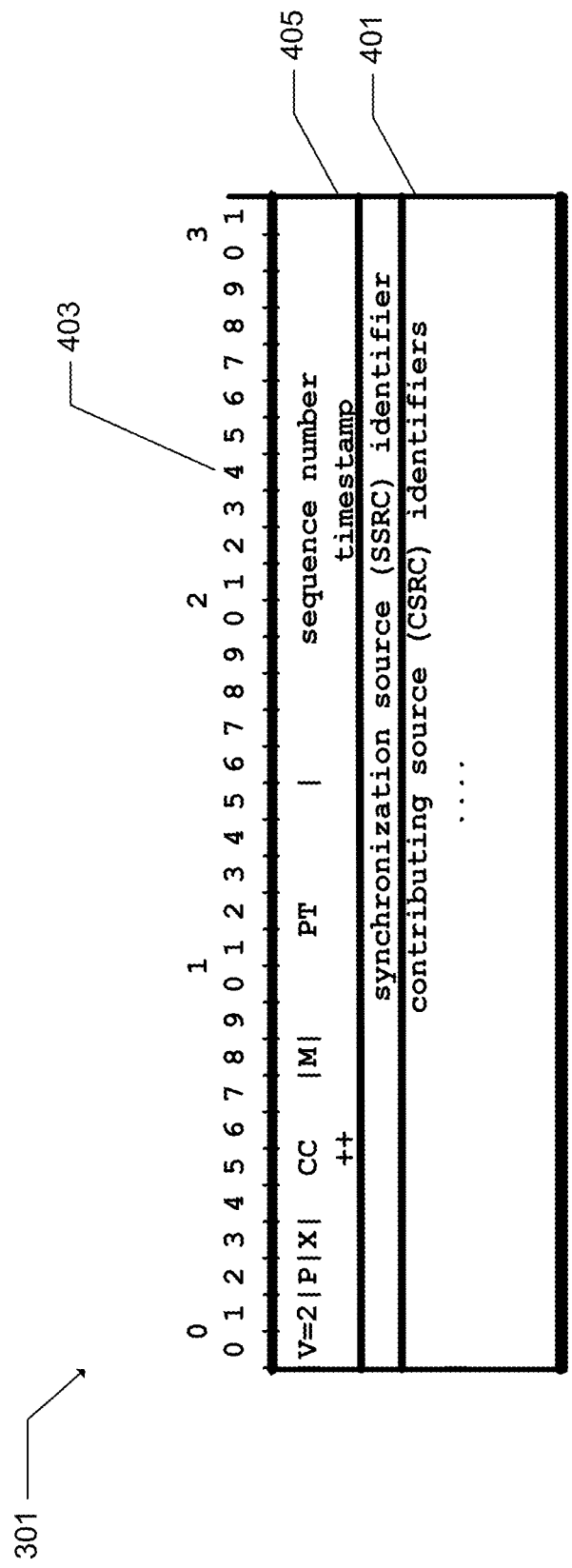
FIG. 4 depicts format of an RTP header.

FIG. 4 shows the RTP header 301 in detail. The RTP header 301 includes a field 401 that identifies the source, and a field 403 that identifies the sequence number. The sequence number is used for performing packet resequencing and packet loss detection operations. The RTP header 301 also contains a time stamp 405 that facilitates Intra-media synchronization (e.g., playout with jitter buffer) and Inter-media synchronization (e.g., synchronizing audio and video).

The RTP control protocol (RTCP) operates with RTP and periodically transmits control packets containing feedback on the quality of service. The RTCP feedback includes a receiver report (RR), which informs the sender which packets have been received thus far and includes associated statistics. For example, RR includes information on the fraction of RTP packets lost since the previous RR packet, RTP packet jitter, etc. The RR report can also contain payload specific feedback information, such as request for intra-refresh, information about lost or damaged regions within a frame, etc.

Some aspects of conventional video coding and transmission techniques are used herein such as basic principles of video coding including temporal prediction, I, P, and B frames, etc. Introductory material of this sort can be found in [6].

Encoding structures—Real-time applications, such as video telephony, impose stringent latency constraints on the process of video encoding and decoding. For example, bi-directional prediction increases decoder latency and typically is not used. FIG. 5 illustrates a classic "IPPP" video encoding structure. Such structure comprises an Intra (I) or "instantaneous decode refresh" (IDR) frame 501 followed by one or more backward prediction frames (P-frames) 503, where every P-frame 503 is predicted from a previous frame, whether an I frame, IDR frame, or another P frame 503. A transmission approach that uses this structure without any feedback is termed a "no feedback" approach. Several modern video codecs, such as H.264|MPEG-4 AVC, also allow prediction to be made on the basis of multiple frames from the past. Such structures exhibit many of the same properties as simple IPPP structure described below.

The effects of packet loss and some feedback-based techniques for reducing error propagation after a lost packet will now be described. As illustrated in FIG. 6, the predictive nature of encoded video makes it susceptible to loss propagation in case of channel errors. Thus, if during transmission, one of the P-frames, such as P frame 603x, is lost, successive P-frames, such as P frames 603y are corrupted, (typically until the next I frame is received). If feedback is available between the receiver and sender, it may be used to limit error propagation by changing the way the sender encodes successive frames after receiving the feedback. The feedback may convey a positive acknowledgement (ACK) or a negative acknowledgement (NACK), where ACK is used to indicate frames/slices correctly received, while NACK indicates frames/slices that are lost. NACK/ACK data may be accumulated at the receiver before being transmitted as a report to the sender. Thus, there often is a delay in transmitting the feedback report. The report can be encapsulated according to RFC 4585 [2] and ITU-T H.271 [3] and carried in RTCP reports [4]. The collection period for the RTCP report is regulated by the timing rules specified in RFC 4585.

Upon receipt of feedback indicating an error in transmission of a particular frame, the encoder may change the way it encodes successive frames after receiving the packet loss feedback.

In video coding, two known methods for limiting error propagation based on feedback are Intra Refresh (IR) and Reference Picture Selection (RPS). Both methods do not add latency to the encoder, and produce standard-compliant bitstreams. These methods may be used in association with many existing video codecs, including H.263 and H.264. In a further embodiment, a Reference Set of Pictures Selection (RSPS) is described that may be specific to H.264 and future codecs using multiple reference pictures.

FIG. 7 illustrates an Intra Refresh mechanism. The packet loss feedback report can comprise ACK/NACK on a MB/slice/frame level basis. FIG. 10A illustrates Intra refresh for reports that contain, as an example, frame level information. Let us assume that the decoder detects the $k^{th}$ frame 603-$k$ to be lost, and transmits feedback information to that effect to the encoder. Further, let us assume that the encoder receives that feedback information after the $(k+n)^{th}$ frame 603-$k+n$, it encodes the next frame as an I-frame or IDR frame 601$x$, and successive frames as P-frames. By using an IDR frame, no frames in the past are used for predicting future frames, thereby terminating error propagation at frame 801$x$, which is n+1 frames after the erroneous frame 803-$k$, where n essentially comprises the delay between transmission of the erroneous frame and the encoder receiving the feedback that the frame was received erroneously. A drawback of using intra refresh is that it uses IDR frames that consume more bits compared to P-frames.

In a second embodiment illustrated in FIG. 8A, a Reference Picture Selection (RPS) method is used. In RPS, the feedback report contains ACK/NACK information for frames/slices. As in the previous example, the decoder transmits a feedback after detecting a lost $k^{th}$ frame 803-$k$, and the encoder receives that feedback between the $(k+n)^{th}$ frame and the $(k+n+1)^{th}$ frame. Based on the feedback report, the encoder finds the most recent frame that was successfully transmitted in the past, e.g., frame 803-$k$–1, and uses it to predict the next frame, 803-$k$+n+1.

RPS uses a predictive P-frame instead of Intra (IDR) frame to stop error propagation. In most cases, P-frames use many fewer bits than I frames, which leads to capacity savings.

However, RPS may not be effective for long feedback delays due to lack of correlation between the current frame to be coded and a frame in the distant past.

In further embodiments, aspects of the IR and RPS approaches may be combined. For instance, the encoder may encode the next frame in both IDR and P-predicted modes, and then decide which one to send over the channel.

Figure 8B:
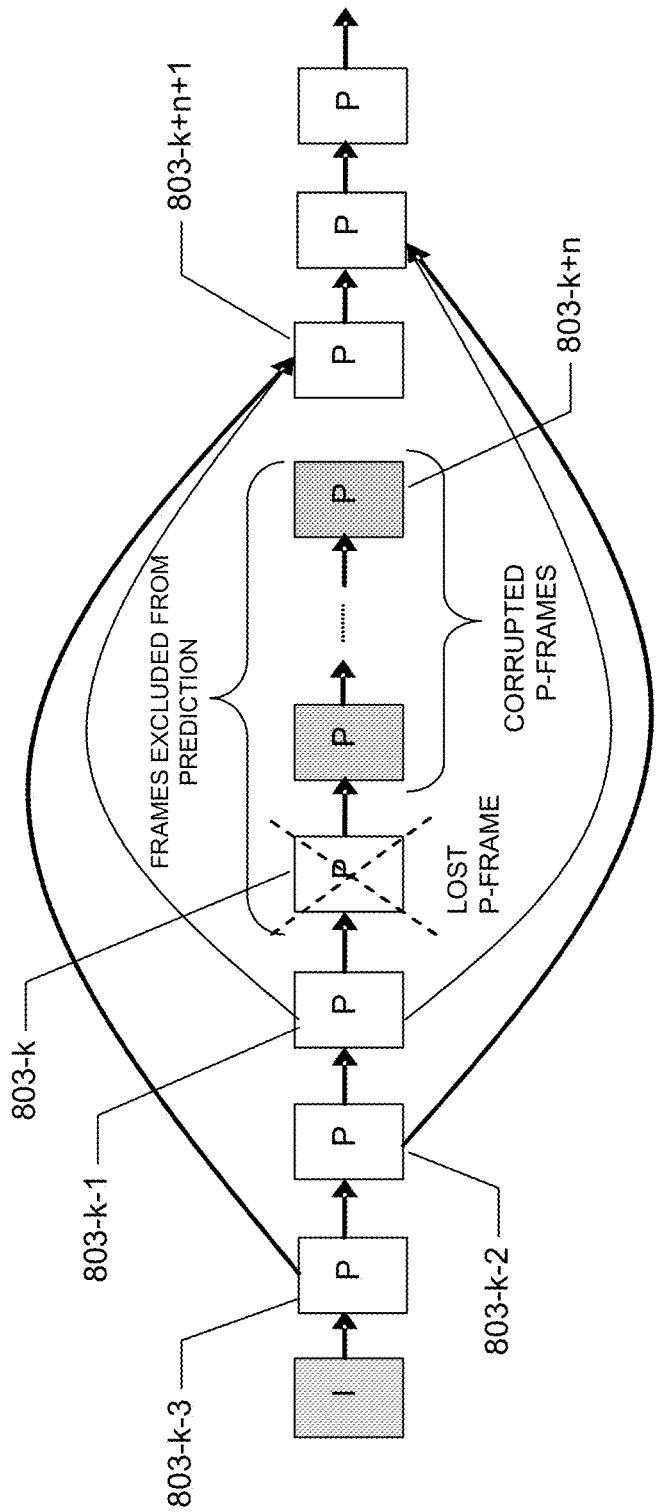
FIG. 8B illustrates another form of error propagation reduction in a predictive video stream.

In a further embodiment illustrated in FIG. 8B, a Reference Set of Pictures Selection (RSPS) method may be used. This embodiment is a generalization of the RPS method, allowing its use with multiple reference picture prediction. For example, it can be used with an H.264 codec. In the RSPS method, after receiving the NACK feedback report, a NACK report received between the encoder's transmission of frames 803-$k+n$ and 803-$k+n+1$ indicating that frame 803-K was lost, successive frames, e.g., frames 803-$k+n+2$ and 803-$k+n+3$, are predicted using any possible subset of the past delivered and uncorrupted frames, e.g., frames 803-$k$–1, 803-$k$–2, 803-$k$–3.

Figures 9, 10:
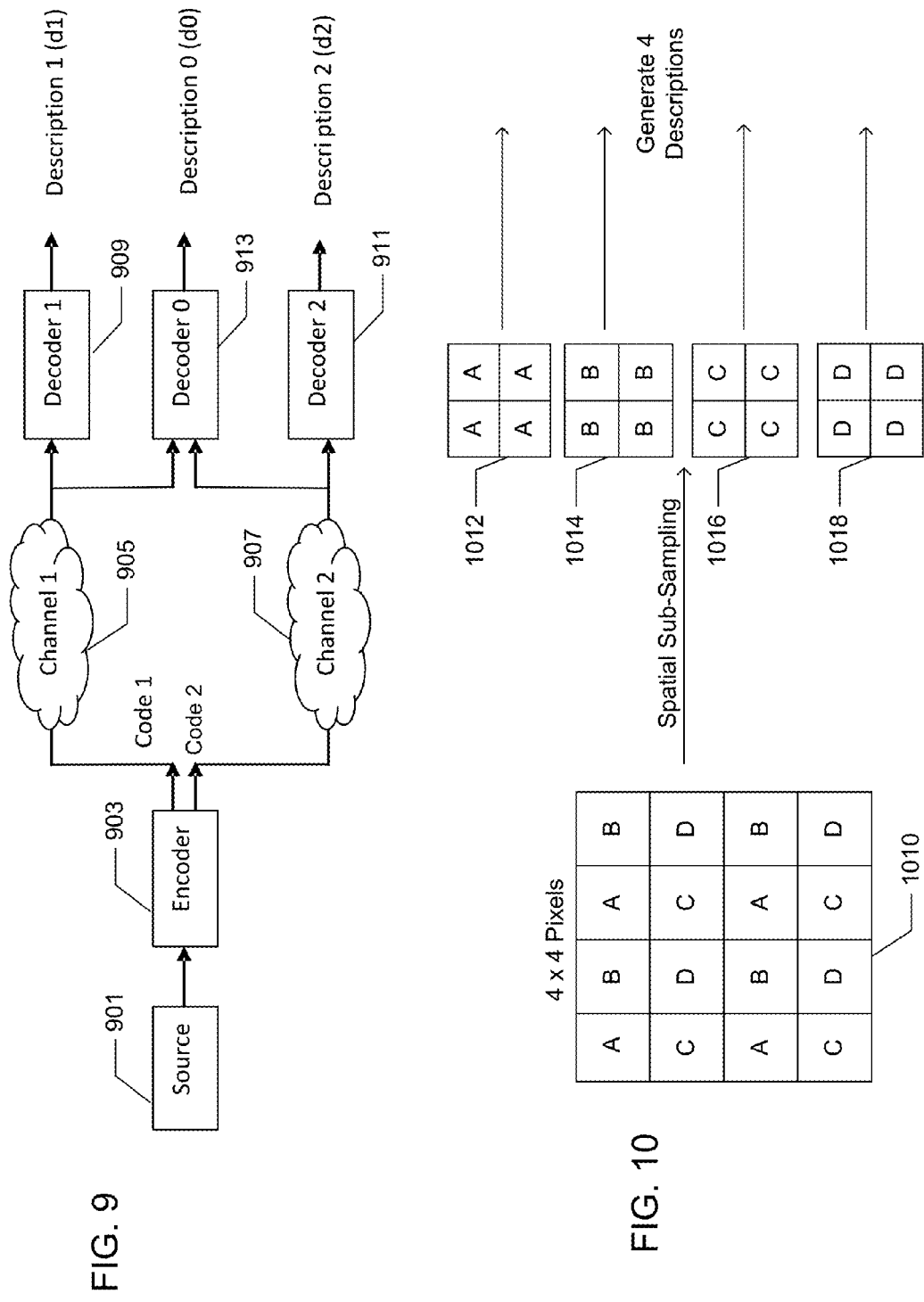
FIG. 9 is a block diagram illustrating multiple description coding for two descriptions.
FIG. 10 is a pictorial illustration demonstrating spatial MDC with four descriptions.

Multiple-Description Coding (MDC) will now be described. Multiple-Description Coding (MDC) of Video refers to a class of source-coding techniques, producing multiple codes (or descriptions) for the same source, such that reception of any of such codes or any subset of them is sufficient for producing a meaningful reconstruction of the source video. The more descriptions that are received, the more accurate the reconstruction of the source should be. FIG. 9 provides a conceptual diagram of an MDC scheme with two descriptions. Here, the encoder 903 produces two descriptions from the source video 901: code 1 and code 2, respectively, and transmits the two codes over separate channels 905 and 907. If only code 1 is received, it can be decoded by a first decoder 909, producing an output description with distortion. Similarly, if only code 2 is received, it can be decoded by a second decoder 911, producing an output description 2 with distortion. If both code 1 and code 2 are received, they can be jointly decoded by a third decoder 913, producing an output description 0 having, most likely, much lower distortion than the distortions in description 1 and description 2. According to the theory of the subject, if the encoding scheme is designed properly, the distortion for the joint decoding (d0) should approach the distortion ratio characteristics of the source.

In case of video transmission of packet-based networks, code 1 and code 2 may represent sub-sequences of packets generated by the encoder, and therefore the loss of any single packet will affect, at most, one description.

Scalable or Successive Refinement (SR) coding systems include a Base Layer, and an Enhancement layer. MPEG-4 FGS and SVC are well known examples of scalable video codecs. In scalable coding, the loss of the base layer means that no meaningful description can be generated. On the contrary, in an MDC scheme, the loss of either layer/description leaves the other layer/description, which is still useful in generating meaningful data. As mentioned earlier, in general, MDC may use many descriptions, and reception of any subset of them is sufficient for producing meaningful reconstruction.

Existing MDC schemes for video are described in the literature [7, 8, 9]. Briefly described below are some aspects of the most well known implementations of such. They may be broadly classified into two categories, namely, "spatial" and "temporal" MDC coding methods.

In Spatial MDC Video Coding (or, spatial MDC), pixels in each frame are grouped into descriptions. Based on the type of pixel grouping, there are different types of spatial MDC methods. Some exemplary spatial MDC methods are described below.

2×2 spatial sub-sampling: A video frame 1010 can be sub-sampled by two in both dimensions to generate four descriptions 1012, 1014, 1016, and 1018, as illustrated in FIG. 10. If all four descriptions are received at the receiver, they are decoded and interleaved to generate the reconstructed output frame. If however, less than all of the descriptions are received, they are decoded, interleaved, and missing pixels are interpolated to generate the reconstructed frame.

In line/column-based sub-sampling, such as illustrated in FIG. 11, each frame 1101 can be interlaced into two fields that form two descriptions, 1103 and 1105. Each field is encoded and transmitted as a separate sequence of packets. If both sequences of packets are received, the decoding of both is completed by multiplexing the two fields into a complete frame. If only one of the sequences is successfully received, the decoding is completed by vertical interpolation.

Figure 13:
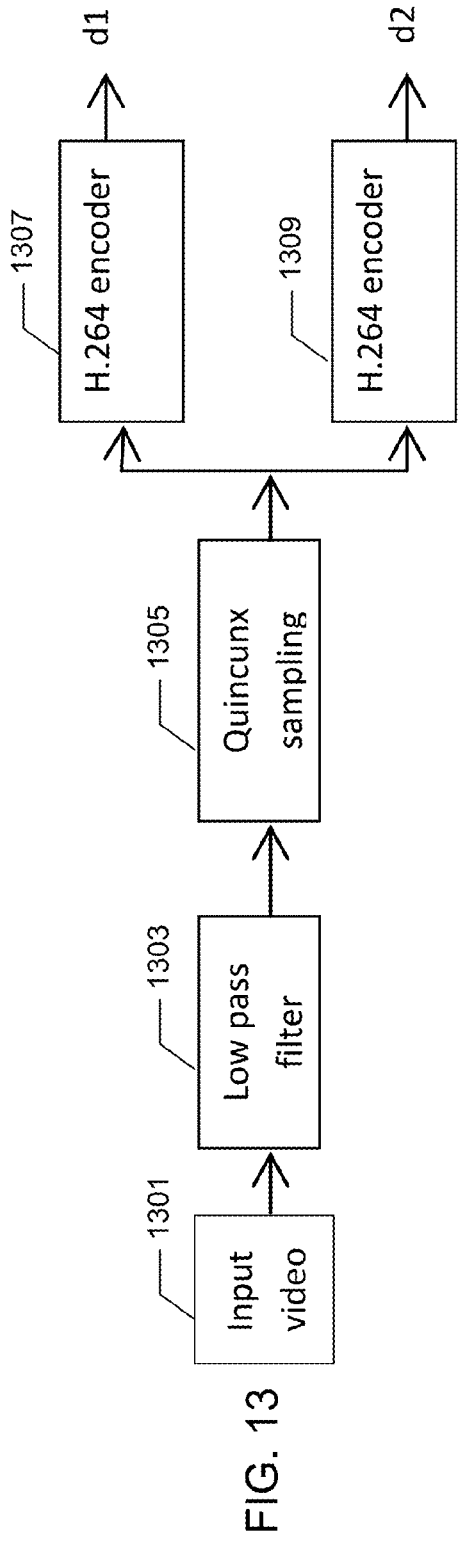
FIG. 13 is a block diagram of a spatial multiple description coder using quincunx sampling.
Figure 14:
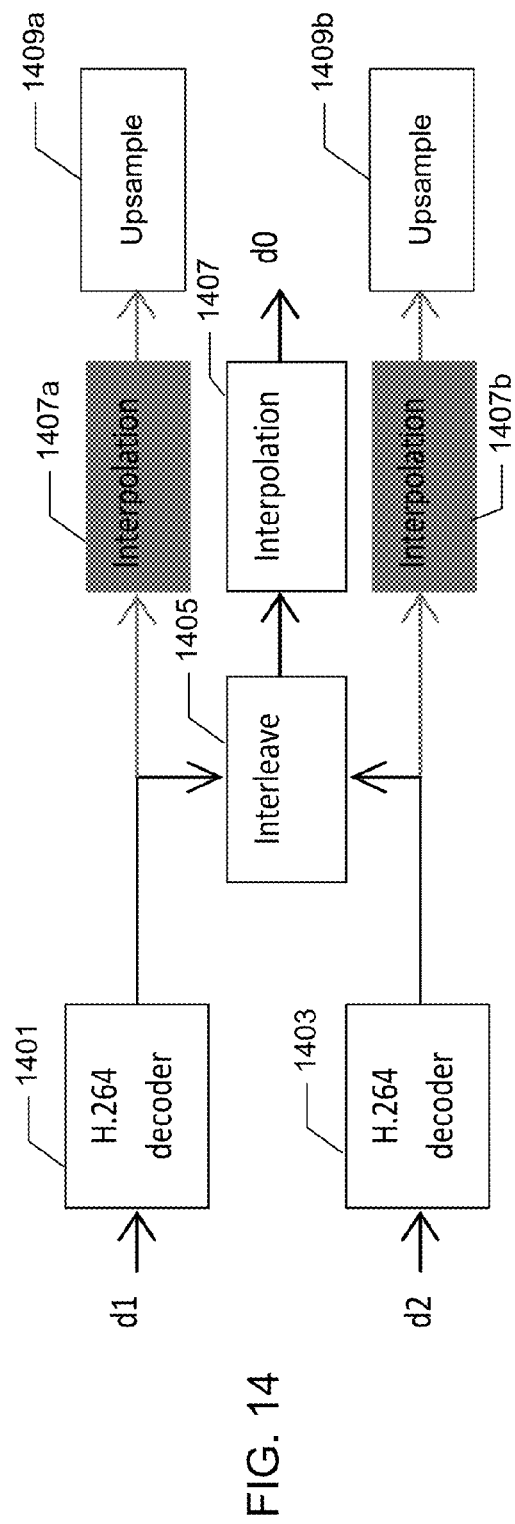
FIG. 14 is a block diagram of a decoder for decoding multiple descriptions at a receiver.

Spatial MDC by means of quincunx sampling is illustrated in FIG. 12, where the pixels of frame 1201 labeled A and B are subsampled to generate two descriptions 1203, 1205. The pixels labeled C and D are then interpolated from the surrounding A and B pixels. More particularly, each of the C and D pixels may be interpolated from the two A pixels and the two B pixels that are spatially closest to it. In some embodiments described herein, quincunx sampling is used as a basis for MDC coding. An example implementation of quincunx-based MDC coding is shown in FIG. 13. At the transmitter, the input video 1301 is first low pass filtered using an anti-aliasing filter 1303, and quincunx sampled 1305 to generate two descriptions, which are encoded using two H.264 encoders 1307, 1309. At the receiver, as shown in FIG. 14, the multiple description bitstream is decoded, 1401, 1403. If two descriptions are available, they are decoded, 1401 and 1403, spatially interleaved, 1405, and interpolated, 1407, to generate output video. If, on the other hand, only one description is available, it is decoded, 1401 or 1403, interpolated, 1407$a$ or 1407$b$, and upsampled, 1409$a$ or 1409$b$, to generate an output video. An analysis of the efficiency of quincunx sampling-based MDC is set forth in the Experimental Results I section toward the end of this specification.

Figure 15:
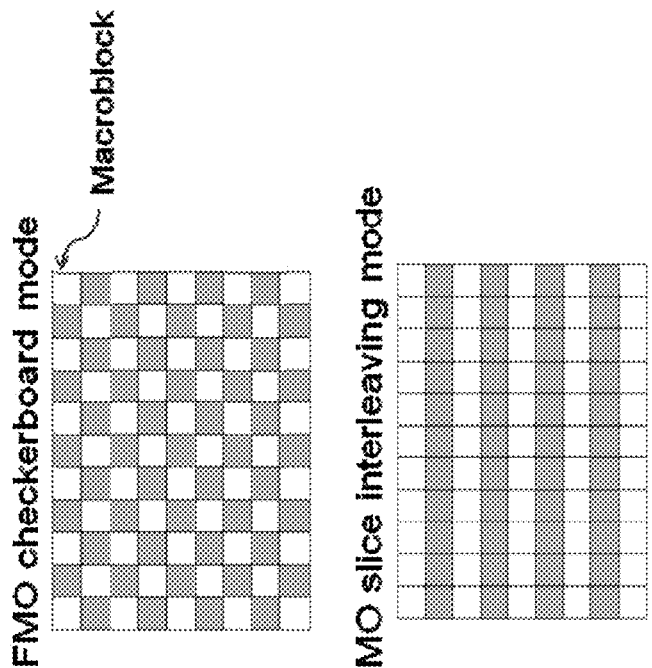
FIG. 15 is a pictorial depiction of two examples of flexible macroblock ordering, in which the first example shows an FMO checkerboard mode, and the second example shows an FMO slice interleaving mode.

Inhomogeneous spatial sub-sampling includes Flexible Macroblock Ordering (FMO). FIG. 15 shows two examples of FMO, both having two slice groups. In the first example, a checkerboard pattern of white and grey is considered, where every white macroblock is assigned to one slice group, and every grey macroblock is assigned to a second slice group. In the second example, odd and even rows of macroblocks are assigned to different slice groups, respectively. If one of the slice groups is lost, the output frame can still be reconstructed by interpolating the received slice groups. This is similar to the embodiments described in connection with FIGS. 10 and 11, except on a macroblock scale as opposed to pixel scale. Since slice groups are very similar to descriptions in MDC, FMO is a type of spatial MDC.

Figure 16:
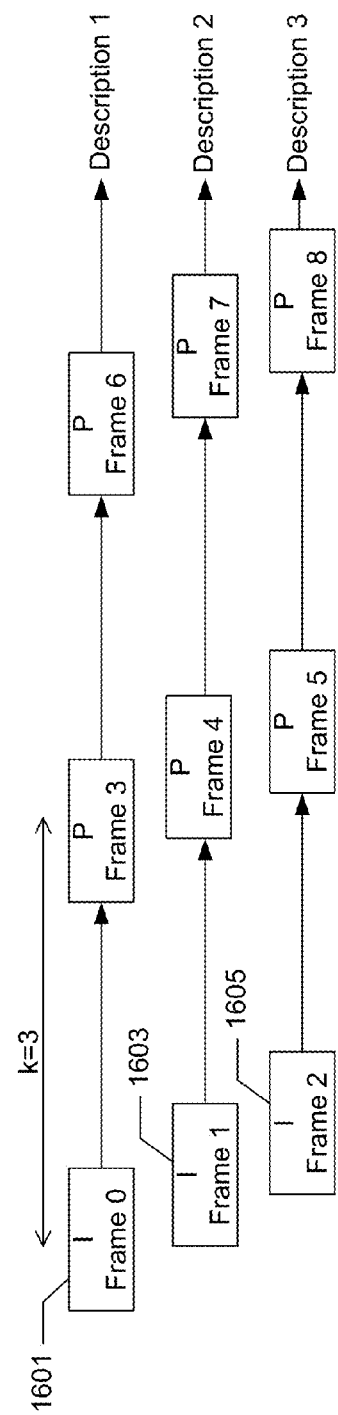
FIG. 16 is a pictorial depiction of temporal MDC by periodically sampling frames by an interval k=3.

In temporal multiple description video coding (temporal MDC), video frames are grouped to form descriptions. One common approach for generating temporal multiple descriptions is to sample the frames periodically. For example, in FIG. 16, three descriptions 1601, 1603, 1605 are generated using a sampling interval of m=3. This MDC is referred to herein as homogeneous temporal MDC. As described above, it is assumed that each frame is sent as an RTP packet (or sequence of RTP packets containing slices of this frame). The encoded frames still have temporal dependencies of the IPPP structure, but now there are m such interleaved structures, instead of 1. Therefore, a single packet/frame loss will corrupt only a subset of frames to follow, which are localized to one of m descriptions.

Error recovery mechanisms for temporal multiple description coding may utilize feedback. They can be classified into methods that use RPS [11] [12] and methods that use error concealment [12]. Both types of methods assume that packet loss occurs during uplink between a UE (MS1) and an eNodeB (BS1), and use NACK to communicate packet loss to the encoder. They also assume very short delay for NACK arrival.

Figure 17:
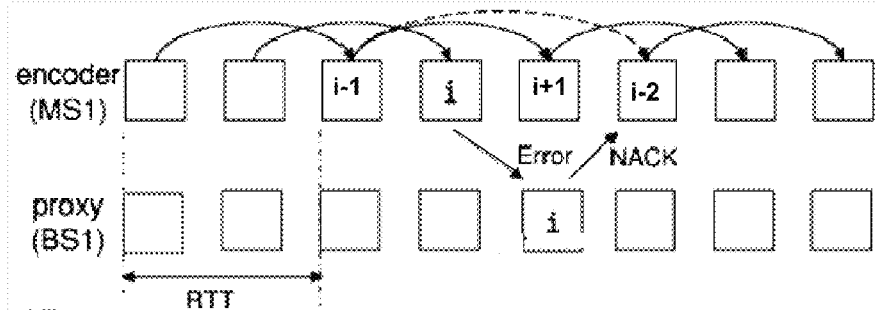
FIG. 17 is a pictorial demonstrating frame level RPS.

There are two types of RPS-based methods, namely, frame-level and slice-level methods. Referring to FIG. 17, in frame level RPS [11] [12], the receiver, BS1, returns a NACK upon receiving frame 'i' in error. In this method, the encoder, MS1, upon receiving the NACK, encodes the next frame after receiving the NACK, i.e., frame (i+2) in this example, using the frame prior to I, frame (i−1), as the reference for prediction, instead of frame i. If frame i−1 is in error, it instead uses frame (i−2) as the reference for prediction and so on until a frame that is uncorrupted at the receiver is found. By resetting the reference picture, error propagation is limited.

Figure 18:
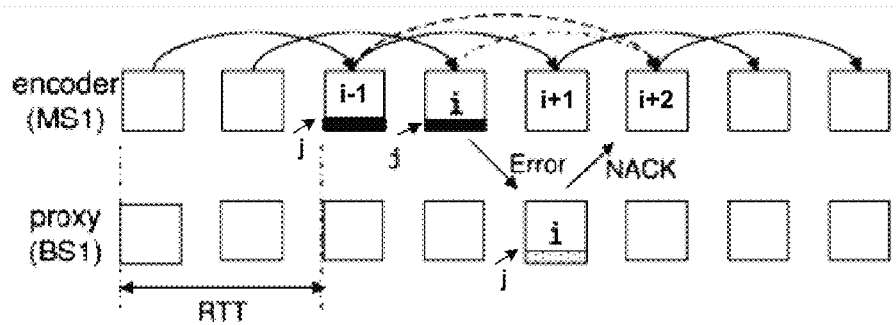
FIG. 18 is a pictorial demonstrating slice level RPS.

In a slice-level implementation, as illustrated in FIG. 18, if slice j in frame i is lost, the encoder, MS 1, used the uncorrupted portion of frame i as a reference together with the corresponding slice j of frame (i−1) to encode the next frame after being notified of the corrupted frame, i.e., frame (i+2). Since i is temporally close to (i+2), using portions of i for prediction would yield better RD performance over frame level RPS using the entirety of frame (i−1).

Both techniques are intended for use in systems with very short notification delay, and may not be suitable for cases where the temporal gap is large.

Figure 19:
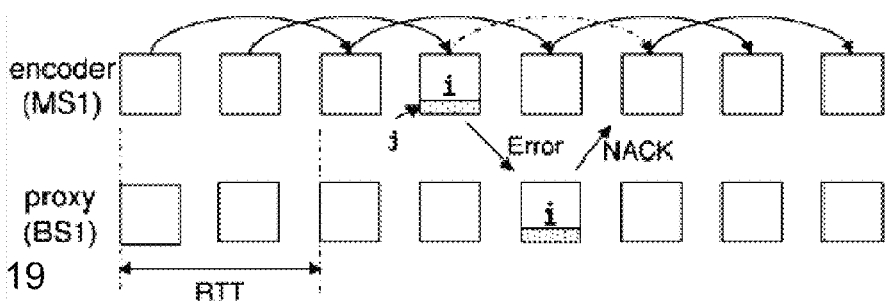
FIG. 19 is a pictorial demonstrating slice level RPS with error concealment.

Referring now to FIG. 19, in an error concealment approach, if an error is detected in slice j of frame i, the proxy, BS1, transmits a NACK to the encoder, MS1. The encoder then conceals slice j of frame i using the same error concealment method used at the decoder and uses the concealed frame i to predict the next frame (i+2). One disadvantage of this approach is that it relies on the decoder behavior, which is not described by video encoder standards. Currently, decoder vendors may implement their own error-concealment tools, and their results may not match. Another problem with the described approach is that it seems to be practical only for short delays (1-2 frames). With long delays, such as 1-5 seconds, caused by end-to-end RTCP feedback—re-decoding of all those frames in error-concealment mode in a single-frame time slot would require significant power. For example, a capability to do 10-100-times faster than real-time decode may be needed in order to implement this technique.

Methods and apparatuses for encoding and error-correction of video in transmission systems with delayed feedback will now be described. For illustration purposes, the frames are encoded continuously using one slice per frame in the examples. However, it should be understood that the methods described herein are applicable to multiple slices per frame. Again to simplify the illustration, one reference frame is shown during the encoding of each description, although multiple reference frames may be used in alternative embodiments.

Figure 20:
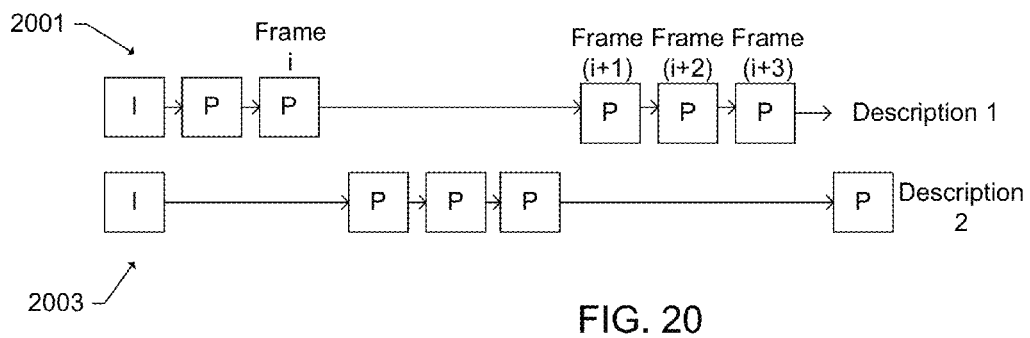
FIG. 20 is a pictorial demonstrating temporal Inhomogeneous MDC with two description and interleaving interval k=3.

The inhomogeneous temporal MDC approach for video coding uses a temporal MDC method where the temporal distances between adjacent frames in a description are not equal. The Inhomogeneous temporal MDC (hereinafter IHTMDC) is illustrated with an example in FIG. 20. In FIG. 20, each description, frames i and (i+1) are set four frames apart, while frames (i+1), (i+2), and (i+3) are set one frame apart. In other words, the frames in any given one of the multiple descriptions comprise frames that are temporally inhomogeneous within the original full video signal. Thus, referring to the example of FIG. 20, the video comprises two descriptions 2001 and 2003 (any number of descriptions are possible), with each stream comprising a series of three consecutive frames (of the full video signal), followed by a gap of three frames (of the full video signal), further followed by three more consecutive frames (of the full video signal), and so on. So, if we consider the full original video signal to comprise a temporal sequence of frames, comprising frames 0-20, then the first description 2001 may comprise, for example, original frames 0, 1, 2, 6, 7, 8, 12, 13, 14, 18, 19, and 20; and the second description 2003 comprises frames 3, 4, 5, 9, 10, 11, 15, 16, and 17. Thus, we may define an interleaving interval k in IHTMDC that defines the inhomogeneity within the descriptions. Particularly, k defines the number of consecutive frames of the original video signal that go into each description. In IHTMDC, k may be any integer value.

In the example of FIG. 20, k=3. Inhomogeneous prediction structure provides coding efficiency, as detailed in the Experimental Results I section provided toward the end of this specification. From that analysis, it follows that the use of straightforward homogeneous interleaving with two descriptions causes about a 1-2 dB drop in video quality as compared to conventional, single-description encoding of the same sequence at the same overall rate. By increasing the interleaving interval k, the drop in quality for joint decoding of both descriptions can be significantly reduced. On the other hand, using a very large k has disadvantages also. Particularly, as k becomes larger, a loss of any of the descriptions will introduce jerkiness or ghosting artifacts in the playback. Based on these counterbalancing factors, the best interleave factor may be in the range of k=3 to 8 in many practical cases.

More generally, the interleave parameter k may play the role of an upper bound for the number of consecutive frames allocated to each description, and the actual prediction pattern and allocation of frames between the multiple descriptions may be less regular—reflecting best modes that an encoder can find in encoding each particular video sequence. For instance, the interleave factor can be varied over time as the channel quality changes. Also, the interleave factor may be made different for different descriptions. Typically, the optimal value of k at any given instance will depend on the end-to-end distortion experienced by that description, e.g., the sum of the transmission distortion and the quantization distortion. The end-to-end distortion may be the same or different for different descriptions. thus, each description may use the same interleave factor or different interleave factors. For example, in a two description embodiment, k may be 4 for the first description and 2 for the second description. That is, for example, description 1 may comprise data for frames 1, 2, 3, 4, 7, 8, 9, 10, 13, 14, 15, 16, 19, 20, 21, 22, ..., while description 2 comprises date for frames 5, 6, 11, 12, 17, 18, 23, 24, .... An embodiment with different interleave factors, k, for different descriptions may be advantageous if different descriptions are transmitted over different physical channels with different transmission distortions (as determined by different BERs, for instance).

IHTMDC coding schemes also may support more efficient error concealment and feedback-based error correction mechanisms, as described herein below.

Implementations of some embodiments of IHTMDC may use the H.264 video coding standard. Specifically, IHTMDC may be implemented using an H.264 encoder to generate bitstreams that are H.264 standard compliant. Two IHTMDC implementations are described using an example for two descriptions, although it can be extended to a higher number of descriptions.

Figure 21:
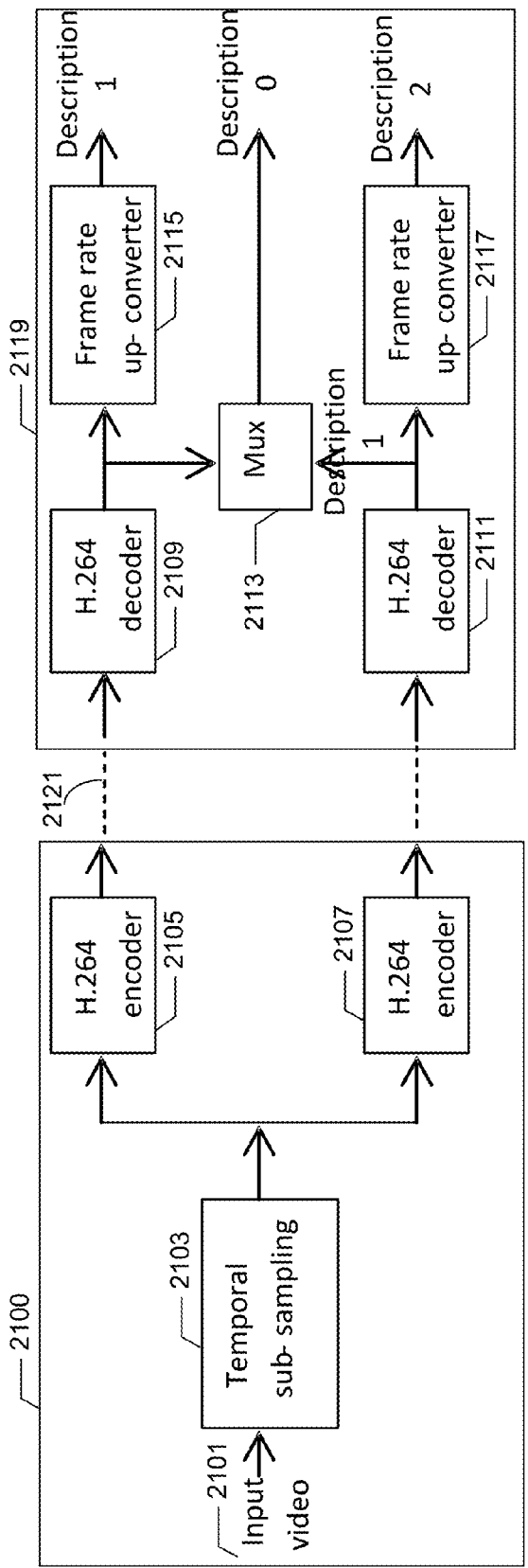
FIG. 21 is a block diagram of one implementation of IHT-MDC using two instances of a H.264 encoder and decoder.

Implementation of IHTMDC using two instances of an H.264 encoder and decoder is illustrated in FIG. 21. It includes the following steps:

(a) At the transmitter/encoder 2100, input video 2101 is sub-sampled to generate two videos having different frames as illustrated in FIG. 20;

(b) Each video obtained from the previous step is encoded using an instance of the H.264 encoder 2103 and 2105;

(c) Video packets corresponding to the two descriptions can be transmitted over the channel 2121 in two possible ways: each description is transmitted over a separate RTP channel or packets corresponding to both descriptions are transmitted over the same RTP channel;

(d) At the receiver 2119, the sequence number of an RTP packet is used to map packets to a description. This assumes that the receiver has prior knowledge about the number of descriptions and interleaving interval. RTP timestamps may also be used to communicate combined order of frames;

(e) Each description is decoded by an instance of a decoder 2109 and 2111;

(f) If both descriptions are received, the decoded videos are multiplexed by multiplexer 2113 to generate output video Description 0. However, if only one description is received, the decoded video is upsampled to a higher frame rate using frame rate up-converter 2115 or 2117 to result in output video Description 1 or Description 2.

Figure 22:
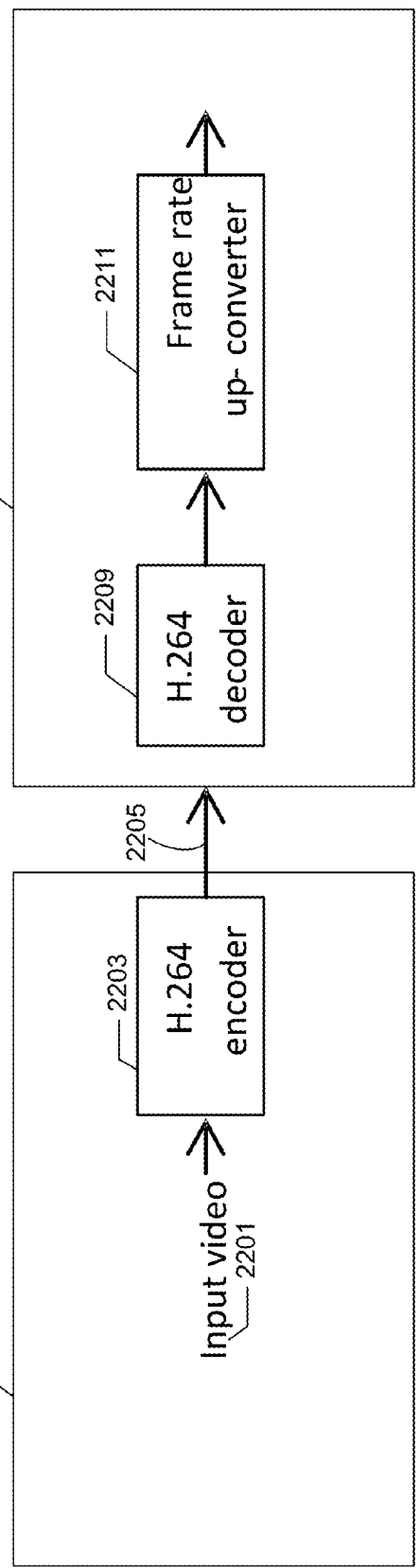
FIG. 22 is a block diagram of one implementation of IHT-MDC using one instance of a H.264 encoder and decoder.

In an alternative embodiment illustrated in FIG. 22, IHTMDC may be implemented using a single instance of an H.264 encoder/decoder. Particularly, at the transmitter 2200, the input video 2201 is encoded by an H.264 encoder 2203 and transmitted over the channel 2205. At the receiver 2207, an H.264 decoder 2209 decodes the signal. Further, error concealment techniques and/or apparatus, such as a frame rate up-converter 2211 can up-sample the decoded video to a higher frame rate if one of the descriptions is lost. Memory management control operations (MMCO) may be used, as well as long-term and short-term reference pictures supported by the H.264 standard. More details about reference picture handling in the H.264 standard is described below in the section of this specification entitled Reference Picture Handling in H.264.

Effects of packet losses on IHTMDC-encoded video are depicted in FIG. 23, which illustrates IHTMDC with two descriptions and frame interval k=4. When one frame 2301 is lost, successive frames 2303 belonging to the lost frame's description are corrupted as shown in FIG. 23.

At the receiver, the decoder's error concealment could discard the corrupted frames while displaying neighboring frames from the uncorrupted description. Therefore, IHTMDC offers more robust delivery of video as compared to a single description IPPP case as shown in FIG. 6, where loss of one frame would result in corruption of the entire video subsequent to that lost frame.

In addition, the IHTMDC scheme may further limit error propagation by using either or both of intra-description or cross-description error concealment and feedback. For instance, as illustrated in FIG. 24, after a lost frame 2401 in one description, in addition to the other description(s) being uncorrupted, IHTMDC also allows error concealment to be performed by predicting the subsequent frames in the description stream containing the lost frame 2401, not only from the frames in the same description that came before the lost frame 2401 (e.g., predicting frame 2403 from earlier frame 2405 in that same stream, as illustrated by arrowed link 2407), but also from the decoded frames in the other description (e.g., predicting frame 2400 from temporally adjacent frame 2411 in the other stream, as illustrated by arrowed link 2413).

Note that when a single H.264 stream is used to implement IHTMDC, as illustrated in the example of FIG. 22, the existing H.264 decoders may be able to take advantage of such additional adjacent frames automatically (or implementations of error concealment may be modified to do so). On the other hand, when IHTMDC is implemented by sending two (or more) H.264 streams, such concealment logic may be implemented additionally as a joint decoding process.

The use of nearest temporally adjacent frames from another, uncorrupted description helps to stop drift of mismatched regions or "ghosting" that may occur if concealment is performed continuously within the same description. In other words, this technique effectively limits error propagation to a maximum duration of k frames, where k is the interleave factor in the IHTMDC scheme.

The example discussed in connection with FIG. 24 assumes that the lost frame is known to the transmitter instantaneously (or at least before the data of the next frame after the lost frame is output). This is not always the case. In some applications of IHTMDC, there may be delayed feedback of the fact of a lost packet. FIG. 25 demonstrates a case where a decoder has lost a packet and the encoder is notified about the loss by means of delayed feedback (e.g. RTCP). Specifically, frame 2501 and this is determined by the receiver and transmitted back to the transmitter at time t1. This feedback information is received by the transmitter at time t2. Hence, five more frames have been transmitted after lost frame 2501 in the description stream of lost frame 2501 before the transmitter is even aware of the loss.

There are several alternatives for reducing error propagation responsive to error notifications. They include: (1) using Intra/IDR refresh frame to stop error propagation in the description that was affected (see FIG. 26); (2) using RPS technique—by resetting prediction to last delivered frame (see FIG. 27); and (3) using a concealment process in the encoder to recreate the state of the decoder (no illustration provided—and which, as discussed above, would require the same concealment logic in the encoder and decoder—and, therefore, may not be feasible for existing and deployed codec implementations).

In the Intra/IDR refresh technique illustrated in FIG. 26, upon receiving feedback at time t2 that frame 2501 was corrupted at the decoder, the encoder encodes the next frame after time t1 as an I frame or IDR frame, frame 2601, to halt the error propagation.

In the RPS technique illustrated in FIG. 27, upon receiving feedback at time t2 that frame 2501 was corrupted at the decoder, the encoder encodes the next frame after time t1, frame 2701, as a P frame using prediction (see arrow 2705) from the frame prior to the lost frame, e.g., frame 2703, to halt the error propagation.

The use of RPS as illustrated in FIG. 27 is the RPS procedure performed to stop loss propagation within a sub-stream (description) that becomes affected by packet loss. However, IHTMDC offers more possible solutions for using RPS. For example, in one embodiment, the system using RPS may refer to the nearest delivered frames in another one of the description streams. One such example of this operation is shown in FIG. 28. In this form of the RPS technique as illustrated in FIG. 28, upon receiving feedback at time t2 that frame 2501 was corrupted, the encoder encodes the next frame after time t1, frame 2801, as a P frame using prediction (see arrow 2805) from a frame, e.g., frame 2803, from the other description stream. In the embodiment illustrated in FIG. 28, the encoder chooses to predict from the last confirmed frame in the complementary stream, which likely would be the last frame in the complementary stream prior to time t1. Specifically, the difference between time t1 and t2 is the (known and relatively stable) propagation delay for error feedback between the decoder and the encoder. Thus, there could be a lost frame in the complementary stream between time t1 and t2 that the encoder does not yet know about. Therefore, to be safe, it chooses the last frame in that complementary stream that was before time t1 and was not reported as lost by the decoder.

The approaches, shown in FIGS. 27 and 28, have long prediction gaps due to the feedback delay. The delay is about 16 frames in these examples, which is not unreasonable in practical network environments of today and which corresponds to 480 ms. With RTCP-based feedback, such delay may be much longer—about 1 second or more in some practical networks of today. This reduces the effectiveness of RPS dramatically.

Figure 29:
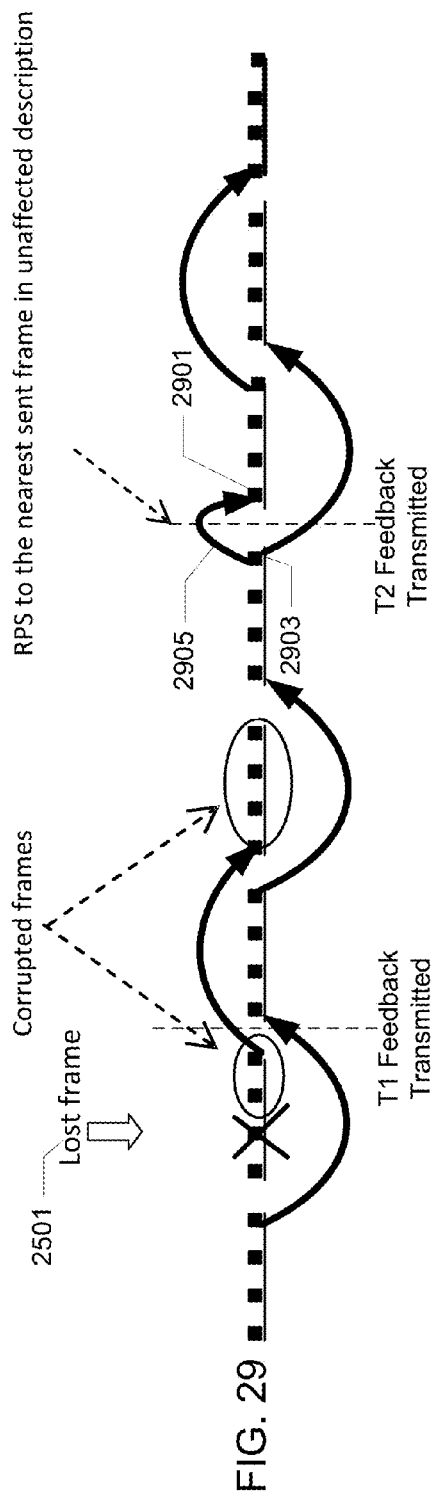
FIG. 29 is a pictorial representation illustrating use of RPS to reference the nearest sent frame in an unaffected description.

Thus, in other embodiments, particularly environments having Bit Error Rates at the lower end of the spectrum, it may be deemed acceptable to use a more recent frame from the complementary stream for prediction and just assume that it has not been lost or corrupted at the decoder. In this case, best coding efficiency is achieved in encoding of a transitional frame. This is illustrated in FIG. 29, in which, upon receiving feedback at time t2 that frame 2501 was corrupted, the encoder encodes the next frame after time t1, frame 2901, as a P frame using prediction (see arrow 2905) from the most recent frame, e.g., frame 2903, from the other description stream.

In yet further embodiments, this technique may be combined with Intra-refresh and conventional RPS approaches, where both types of error propagation cessation techniques are available for use by the encoder and a choice between them is made based, at least in part, on observed packet error rate in the channel (as evidenced by recent history of the lost frame feedback from the decoder).

Experimental Results I

The effectiveness of the algorithms were tested and compared to several existing approaches.

Experimental setup and Simulation results—In order to understand the effectiveness of the above described approaches, experiments were conducted including simulated channels with 10e-2 and 2.5×10e-2 packet error rates, respectively, both of which are typical for conversational/VOIP services in LTE, implemented RTCP notification with one second delay, and implemented no feedback, intra refresh, and IHTMDC mechanisms in the encoder. An interleaving factor of k=8 frames and two descriptions for the IHTMDC was used. An x.264 encoder codebase was used as a starting point for implementing IHTMDC coding schemes. The tests employed a number of standard test video sequences (Mother and daughter, Students, Paris, etc.) representative of video conferencing use scenarios. The results were fairly consistent among all the experiments.

Figure 30:
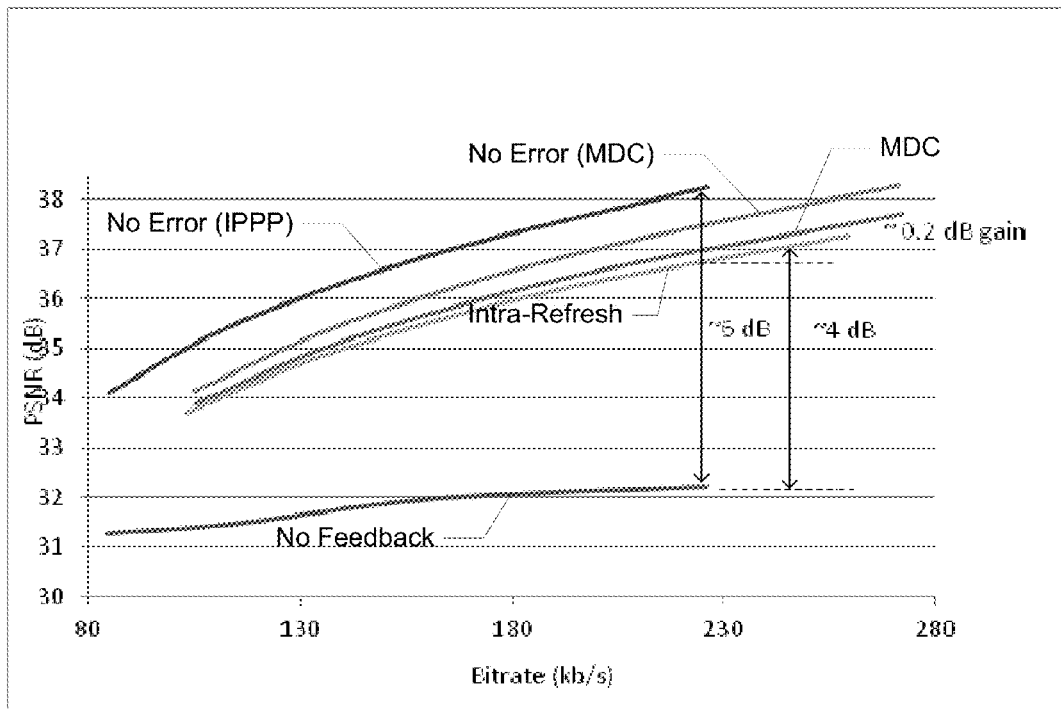
FIG. 30 is a plot of PSNR vs. bit-rate for Students_CIF.yuv video for an RTCP delay of 1 second and a packet error rate=$10^{-2}$.
Figure 31:
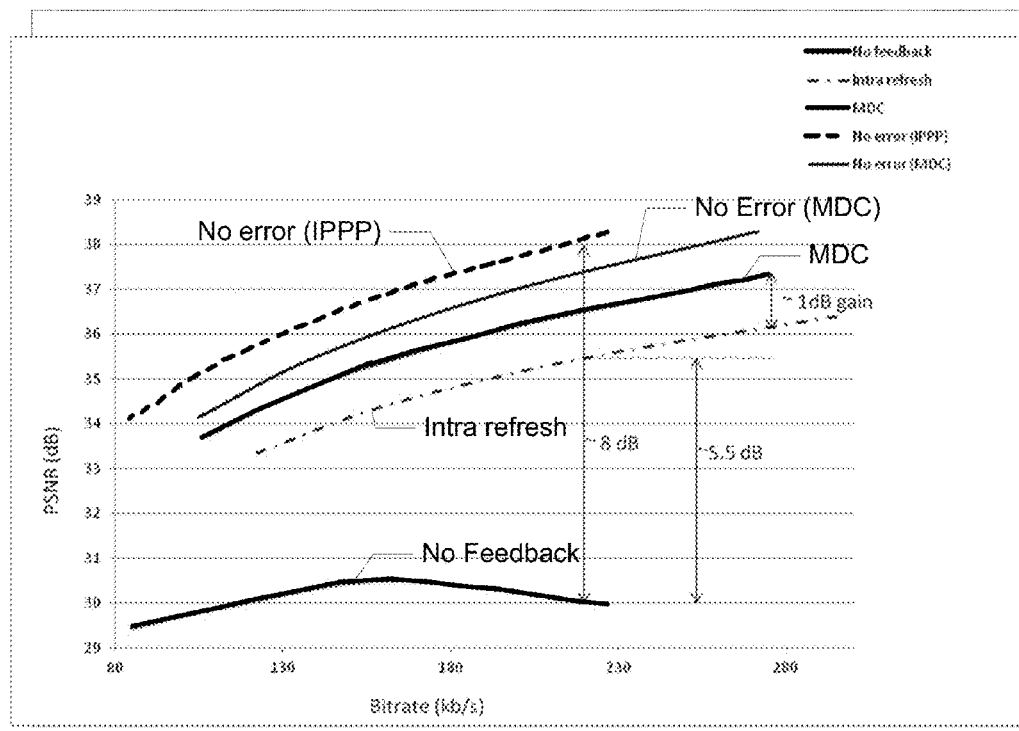
FIG. 31 is a plot of PSNR vs. bit-rate for Students_CIF.yuv video for an RTCP delay of 1 second and a packet error rate=$2.5 \times 10^{-2}$.

The results shown below were obtained for test sequence "Students" (CIF-resolution, 30 fps, 1007 frames), which was looped in forward-backward fashion to produce input video stream for our experiments, and which was encoded at four different quantization parameters: 26, 28, 30, and 32. The resulting rate-distortion plots for packet error rates (PER) =10e-2 and 2.5×10e-2 are given in FIG. 30 and FIG. 31, respectively.

As expected, the 'no feedback' method performed the worst; resulting in PSNR loss of 6 and 8 dB for PER=10e-2 and 2.5×10e-2, respectively, as compared to the no error case. Intra refresh outperformed the "no feedback" method; yielding 4 and 5.5 dB PSNR gain for PER=10e-2 and 2.5×10e-2, respectively, over the no feedback method. The standard RPS technique used with single-description IPPP sequence did not show any improvement as compared to Intra refresh in our test scenario. For this reason, it is not included in this comparison.

Figure 32:
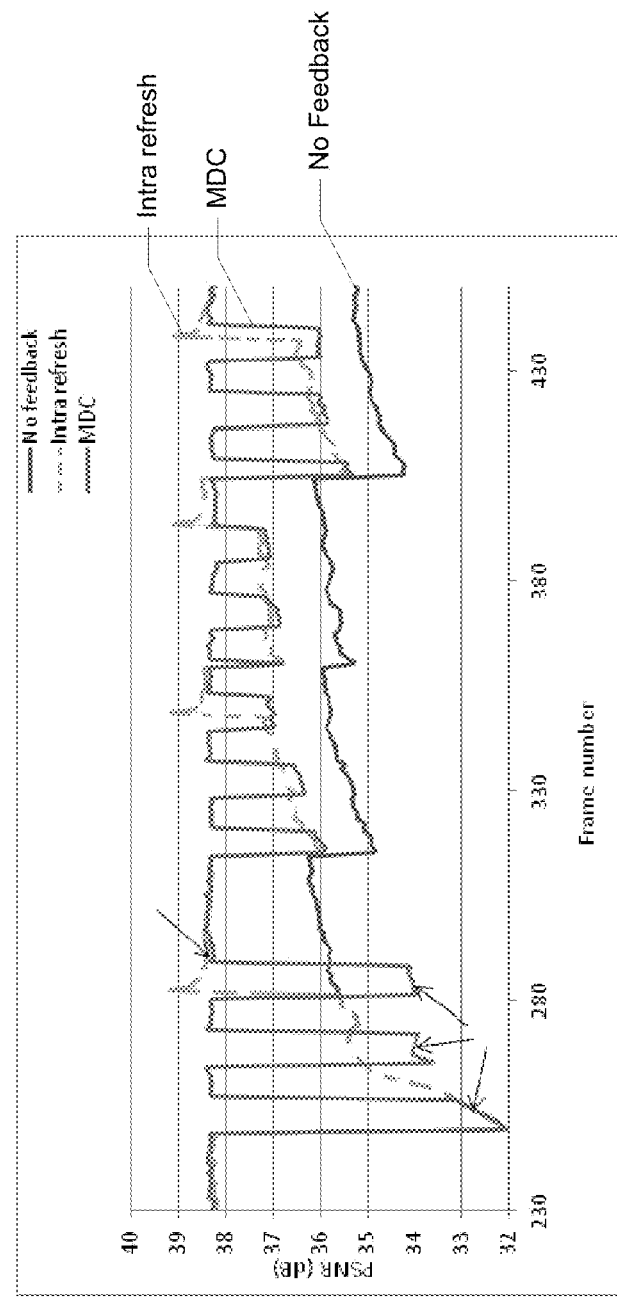
FIG. 32 is a plot of PSNR per frame for Students_CIF.yuv video for an RTCP delay of 1 second, QP=26, and a packet error rate=$10^{-2}$.

On the other hand, the cross-description RPS coupled with IHTMDC showed an additional 0.2 and 1 dB gain for PER=10e-2 and 2.5×10e-2, respectively, over the intra refresh method, thus indicating that the approach has better visual quality over intra refresh. Plots of PSNR per frame for the three methods are shown in FIG. 32. After a frame is lost, intra refresh displays corrupted frames until an RTCP report is received, while the adaptive IHTMDC displays groups of corrupted and uncorrupted frames, which contributes to better visual quality of IHTMDC over intra refresh.

Homogeneous and Inhomogeneous Spatio-Temporal MDC

Figure 33:
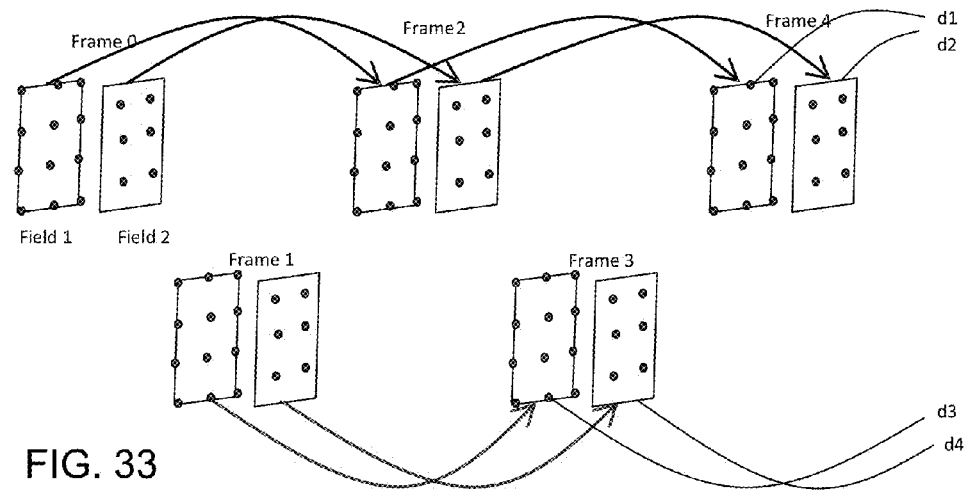
FIG. 33 is a pictorial representation of an example of spatio-temporal MDC with four descriptions.

In addition to IHTMDC, other embodiments include several implementations of a hybrid spatio-temporal MDC technique. Using such techniques, an input video is sub-sampled both spatially and temporally to generate multiple descriptions. An example of spatio-temporal MDC is illustrated in FIG. 33. As can be seen in the FIG., this implementation has four descriptions that divide the original video signal both spatially and temporally. More specifically, quincunx spatial sampling and homogenous temporal sampling are used. The first description comprises information about pixels in the first of the two fields in the even numbered frames, the second description includes information about the pixels in the second of the two fields in the even numbered frames, the third description contains information about the pixels in the first field of the odd numbered frames, and the fourth description includes the information of the pixels of the second field of the odd numbered frames. In this example, the sampling is homogeneous. However, the descriptions also may be temporally and/or spatially inhomogeneous in accordance with the same principles of IHTMDC as described hereinabove.

Figure 34:
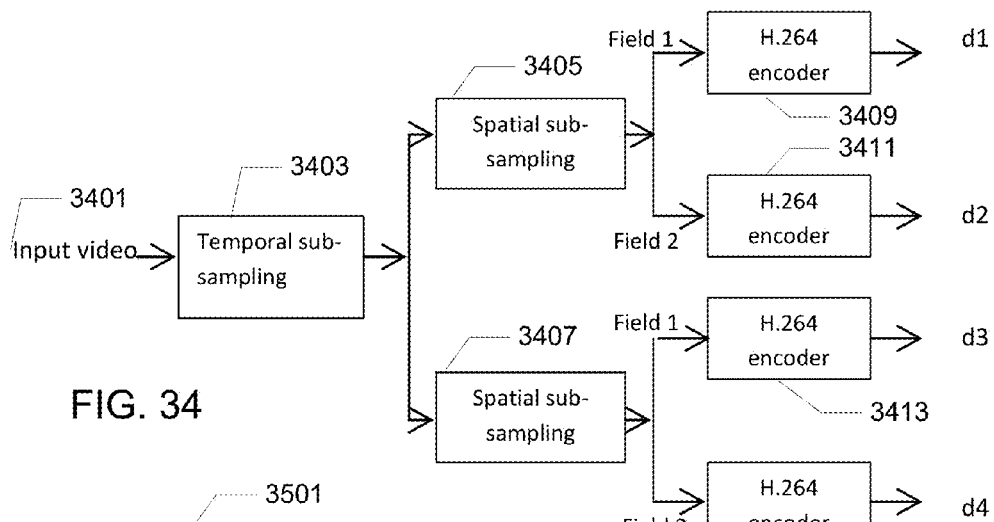
FIG. 34 is a block diagram of a system that generates spatio-temporal multiple descriptions such as shown in FIG. 33.

A spatio-temporal MDC bitstream can be generated using an implementation such as shown in FIG. 34. Here the input video 3401 is first temporally sub-sampled at 3403 by separating the odd and even frames. Each frame is then spatially sub-sampled at 3405 and 3407, respectively, to generate two fields (1 and 2) that are encoded at 3409, 3411, 3413, and 3415 independently to generate descriptions. In other embodiments, spatial sub-sampling is performed first followed by temporal sub-sampling.

Figure 35:
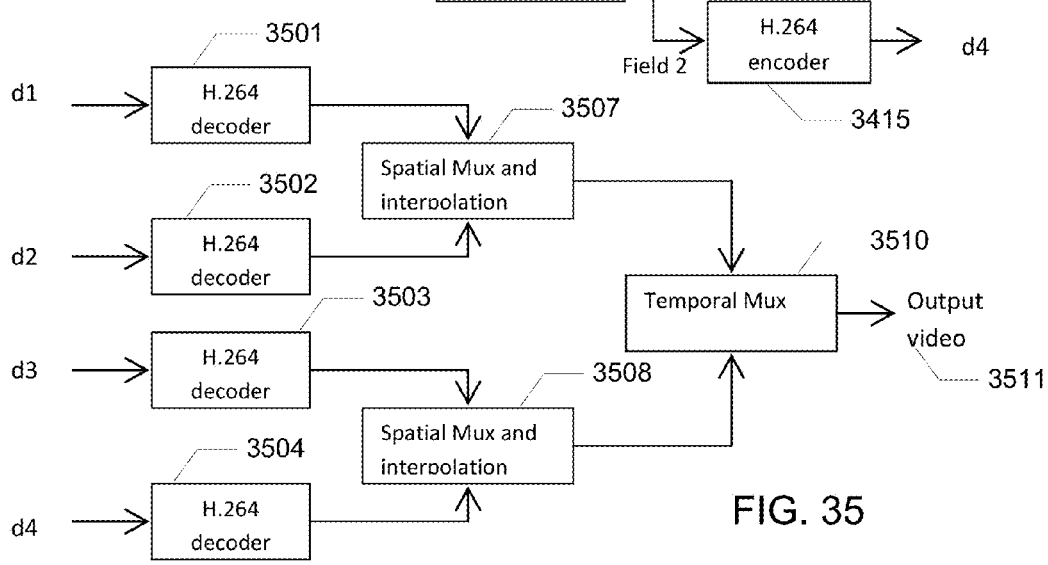
FIG. 35 is a block diagram illustrating generating output video at the receiver using all four descriptions.

The corresponding decoding scenarios implemented at the receiver for this spatio-temporal MDC scheme are shown in FIGS. 35-39, where, based on packets lost, one, two, three, or all four descriptions may be received. There are at least five possible decoding scenarios based on the number of descriptions received. They are illustrated in FIGS. 35-39, respectively, as follows:

(i) All four descriptions are received without error (illustrated by FIG. 35);
(ii) Three of the four descriptions are received without error (illustrated by FIG. 36);
(iii) Two temporally divided descriptions are received without error (illustrated by FIG. 37);
(iv) Two spatially divided descriptions are received without error (illustrated by FIG. 38); and
(v) One description is received without error (illustrated by FIG. 39).

Each of these five scenarios will now be discussed.

In FIG. 35, all four descriptions are received. The descriptions are first decoded at 3501, 3502, 3503, and 3504, respectively, and then spatially multiplexed at 3507 and 3508, respectively, and then interpolated at 3510 to result in output video 3511. The spatial multiplexing (3507, 3508) interleaves two fields to generate a frame. Interpolation is performed here only if pixels were discarded during the spatial sub-sampling 3405, 3407 in the encoder (FIG. 34).

Figure 36:
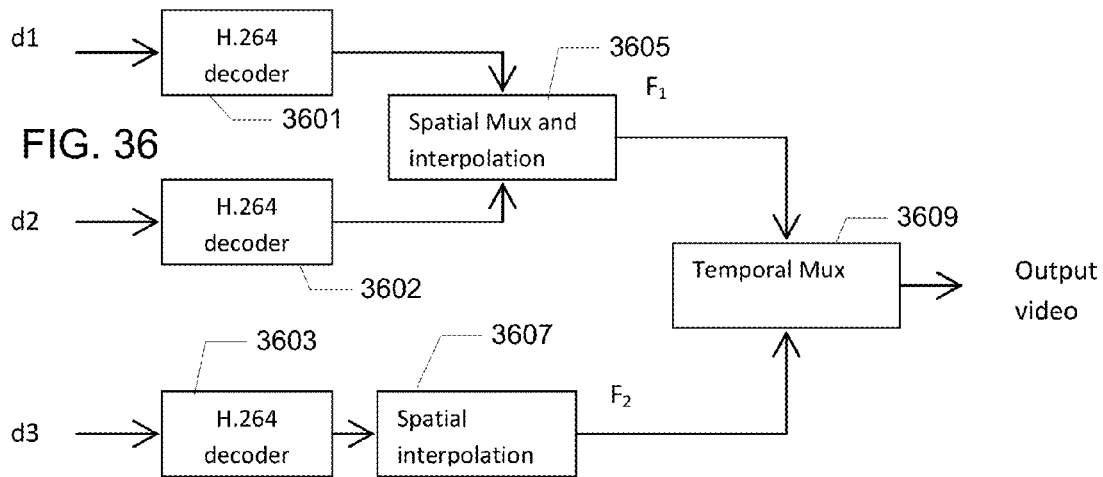
FIG. 36 is a block diagram illustrating generating output video when three descriptions are available at the receiver.

In FIG. 36, three descriptions are received and decoded at 3601, 3602, and 3603, respectively. Two of those three descriptions will be temporally related since they form fields for the same set of frames. In this example, they correspond to descriptions d1 and d2. Descriptions d1 and d2 are spatially multiplexed at 3605. Further, since quincunx sampling was used, they also are spatially interpolated at 3605 to generate the remaining pixels to produce frames F1. Description d3 is spatially interpolated at 3607 to generate frames F2. Frames F1 and F2 are temporally multiplexed at 3609 to generate an output video.

Figure 37:
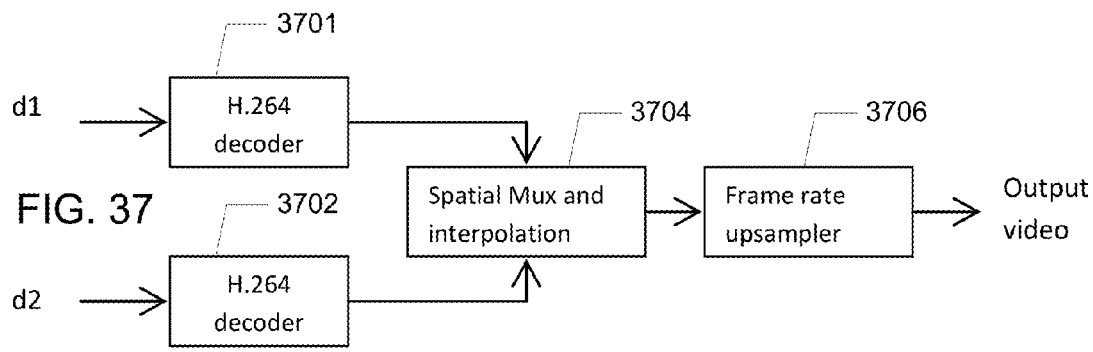
FIG. 37 is a block diagram illustrating generating output video when two temporally related descriptions are available at the receiver.
Figure 38:
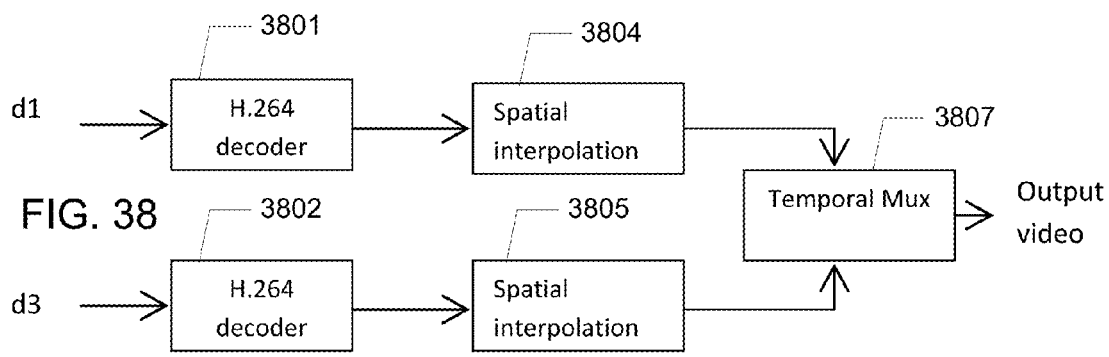
FIG. 38 is a block diagram illustrating generating output when two descriptions that are not temporally related are available at the receiver.

In FIGS. 37 and 38, two descriptions are received. Depending on which two of the four descriptions were received, the two descriptions are either temporally related or spatially related.

FIG. 37 illustrates the scenario for two temporally related descriptions. Two descriptions are temporally related if they contain fields corresponding to the same frame. In FIG. 37, two descriptions are received and decoded at 3701 and 3702, respectively, to generate two different fields, which are then spatially multiplexed and interpolated at 3704 to generate frames. Since only half the frames are generated, they are upsampled to twice the frame rate using frame rate upsampler 3706

FIG. 38, on the other hand, illustrates the scenario if the two received descriptions are spatially related. In the example, descriptions d1 and d3 are received. These descriptions are decoded at 3801 and 3802 to generate respective fields of the same frames. The quincunx sampled fields are converted to frames using spatial interpolation at 3804 and 3805. Finally, they are temporally multiplexed at 3807 to produce the output video.

Figure 39:
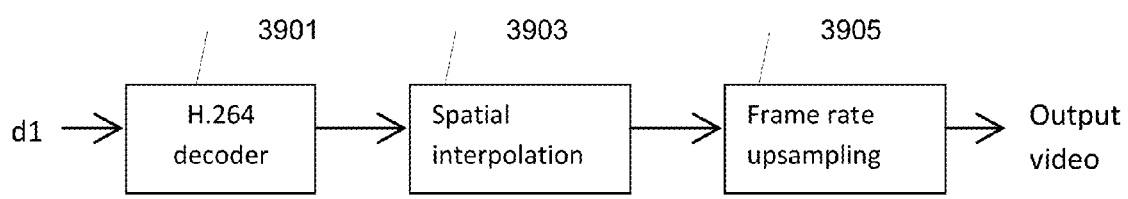
FIG. 39 is a block diagram illustrating generating output video at the receiver using only one description.

Finally, FIG. 39 illustrates the decoder scenario when only one description is received without error. That description is decoded at 3901 to generate date for one of the two fields in every other frame. Each field is spatially interpolated at 3903 to generate complete frames. Then those frames are temporally upsampled to twice the frame rate at 3905 to result in the output video.

As described above, the more descriptions that are received, the lower will be the output distortion.

Generalizing the Coding Methods and Choosing the Best Interleave Factor

In IHTMDC, difference prediction structures can be supported by changing the interleave factor defined in the disclosure. As the interleave factor becomes smaller, the error resilience increases, but compression decreases. Hence, the selection of a proper interleave factor in any given application depends on the channel condition, e.g. packet loss rate (PLR). For higher PLR, a lower interleave factor generally will be better and vice versa. Comparing IHTMDC to Single Description Coding (SDC) and HMDC, for channels without packet loss, standard single description coding will perform the best since its quantization distortion is the lowest. On the other hand, for channels with high PLR, homogeneous temporal MDC is likely to perform best since its transmission distortion is the lowest among those three.

Described below is one theoretical method that may be used to select an interleave factor.

Generalizing the Coding Methods: Single Description Coding (SDC), homogeneous temporal (HTMDC), and IHTMDC each may be characterized as generalized MDC (GMDC) by defining a parameter k as:

$$k = n + \frac{1+n}{1+m}, \tag{1}$$

wherein n is the number of extra descriptions over SDC (i.e., the number of descriptions minus 1) and m is the number of skipped frames in each description. Thus, for example, for SDC k=1, that is, n=0 and m=0. For HMDC, n∈ $\mathbb{Z}^+$ and m=n, and therefore k=n+1. Finally, for IHTMDC, n∈ $\mathbb{Z}^+$ and m>n. Therefore, n<k<n+1. For example, in the IHTMDC system illustrated by FIG. 20, n=1 and m=3.

As previously noted, the larger that k is, the higher the error resilience. Therefore, k is referred to herein as Error Resilience Indication (ERI). In the following discussion, we assume that n=1 and that all descriptions have the same m. Nevertheless, it should be understood that Equation (1) may be extended into larger n and unequal m or even into time-varying m within each description.

Choosing the Best ERI: By Equation (1), choosing a best coding method and the best interleave factor can be generalized by choosing a best ERI. In an end-to-end system, the best ERI can be solved for by minimizing the end-to-end distortion $D_{ETE}$ (Equation 2).

$$k^* = \arg\min_{k \in R^+} D_{ETE}(k) \tag{2}$$

If we assume the quantization error is uncorrelated to tie transmission error and the mean of quantization error is zero, it is easy to prove that:

$$D_{ETE}(k) = D_Q(k) + D_T(k). \tag{3}$$

where $D_Q(k)$ is the quantization distortion and $D_T(k)$ is the transmission distortion.

The proof is as follows:
From the definition, we have $$D_{ETE} \triangleq E\left[\frac{1}{|V|}\sum_{u \in V}(f_u - \tilde{f}_u)^2\right], \tag{7}$$

where v is the set of pixels in the sequence; $f_u$ is the original pixel value for pixel u in the sequence; $\tilde{f}_u$ is the reconstructed pixel value for the corresponding pixel at the decoder.

Define quantization error as $f_u - \hat{f}_u$ and transmission error as $\hat{f}_u - \tilde{f}_u$, where $\hat{f}_u$ is the reconstructed pixel value for pixel u in the sequence at the encoder. For a given k, $f_u - \hat{f}_u$ depends mainly on the quantization parameter (QP)[1], while $\hat{f}_u - \tilde{f}_u$ mainly depends on the PEP and the error concealment scheme. In addition, experimental results show that $f_u - \hat{f}_u$ is zero-mean statistically. Therefore, we make the following assumption.

[1] In the rate control algorithm design, quantization offset is often fixed.

Assumption 1: $f_u - \hat{f}_u$ and $\hat{f}_u - \tilde{f}_u$ are uncorrelated, and $E[f_u - \hat{f}_u] = 0$.

Under Assumption 1, from (7), we obtain $$D_{ETE} = E\left[\frac{1}{|V|}\sum_{u \in V}(f_u - \hat{f}_u)^2\right] + E\left[\frac{1}{|V|}\sum_{u \in V}(\hat{f}_u - \tilde{f}_u)^2\right] + \quad (8)$$

$$\frac{2}{|V|}\sum_{u \in V} E[(f_u - \hat{f}_u)]E[(\hat{f}_u - \tilde{f}_u)]$$

$$= E\left[\frac{1}{|V|}\sum_{u \in V}(f_u - \hat{f}_u)^2\right] + E\left[\frac{1}{|V|}\sum_{u \in V}(\hat{f}_u - \tilde{f}_u)^2\right]$$

$$= D_Q + D_T,$$

where $D_Q$ is called quantization distortion and defined as $$D_Q \triangleq E\left[\frac{1}{|V|}\sum_{u \in V}(f_u - \hat{f}_u)^2\right];$$

and $D_T$ is called transmission distortion and defined as $$D_T \triangleq E\left[\frac{1}{|V|}\sum_{u \in V}(\hat{f}_u - \tilde{f}_u)^2\right].$$

Figure 40:
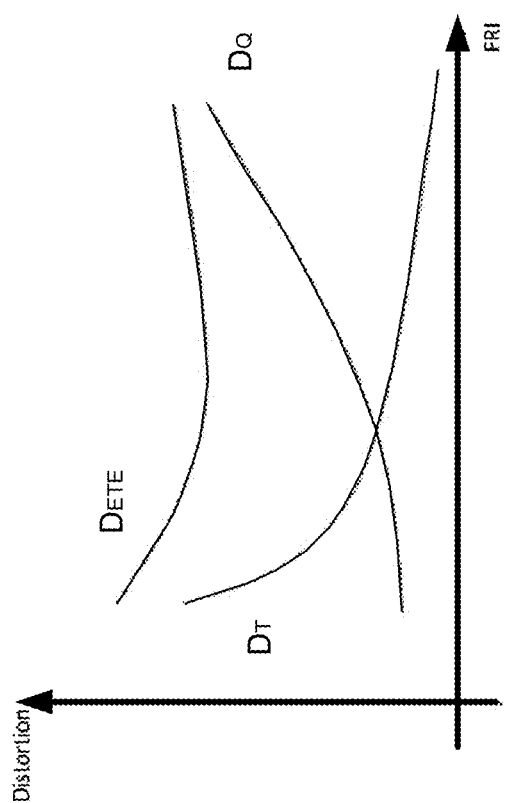
FIG. 40 is a plot depicting the relationship between distortion and ERI.

On one hand, the larger the ERI, the larger the error resilience and hence lower transmission distortion $D_T$. On the other hand, the larger the ERI, the lower the compression and hence the larger the quantization distortion $D_Q$, as shown in FIG. 40.

Therefore, Equation (2) becomes:

$$k^* = \arg\min_{k \in R^+} D_Q(k) + D_T(k) \quad (4)$$

As described above, the best ERI may be channel dependent and source dependent. This can be solved by extending Equation (4) to:

$$k^*(\phi_s, \phi_c) = \arg\min_{k \in R^+} D_Q(k, \phi_s, \phi_c) + D_T(k, \phi_s, \phi_c), \quad (5)$$

where $\phi_s$ and $\phi_c$ denote the statistics of source and channel, respectively. For video source coding in the application layer, the throughput R is limited and the PLR is given by the channel.

Therefore, Equation (5) can be formulated as:

$$k^*(\phi_s, R, PLR) = \arg\min_{k \in R^+} D_Q(k, \phi_s, R) + D_T(k, \phi_s, PLR), \quad (6)$$

There are many accurate quantization distortion models as a function of $\phi_s$ and R, and transmission distortion models as a function of $\phi_s$ and PLR in the literature. We can integrate the channel estimation algorithms, e.g. using Kalman filter, to estimate R and PLR for system design.

Existing quantization distortion models and transmission distortion models may be extended to support the new variable ERI. In embodiments where there is a feedback channel, Equation (6) may be extended to support different feedback delays.

MB-Level Error-Resilient RDO

In a further embodiment, a method is provided to generalize the coding method and choose the best ERI in a GOP (Group of Pictures) level. In this embodiment, an error-resilient Rate Distortion Optimization (RDO) method may be used to further improve the error resilience in the MacroBlock (MB) level. If there is feedback, the best reference frame instead of an intra frame is selected to minimize error propagation. Within each frame, the RDO process is enabled to select the best prediction mode. However, in the RDO process, only the quantization distortion is considered. When the reference frame selected as the base from which to predict the next frame is correctly received, there is no problem. However, as previously noted, there is always some delay in the feedback. If the encoder selects a frame as the basis for prediction before the ACK/NACK corresponding to that base frame is received from the receiver, it is possible that the selected base frame itself is corrupted at the receiver. Obviously, predictive decoding at the receiver using a corrupted base frame would lead to significant error propagation at the receiver. In a practical encoder, random intra MB refresh, e.g. Joint Model (JM), or regular intra MB refresh, e.g. x264, has been implemented to mitigate this problem. It may be further improved by taking PLR into account. For example, the end-to-end distortion of each MB under different prediction modes may be estimated, and the prediction mode yielding the minimum expected distortion can be chosen. The estimate of the PLR can be determined by incorporating the channel estimation algorithms into the encoder.

Exemplary Communications Systems in which IHTMDC, Etc. May be Incorporated

Figure 41A:
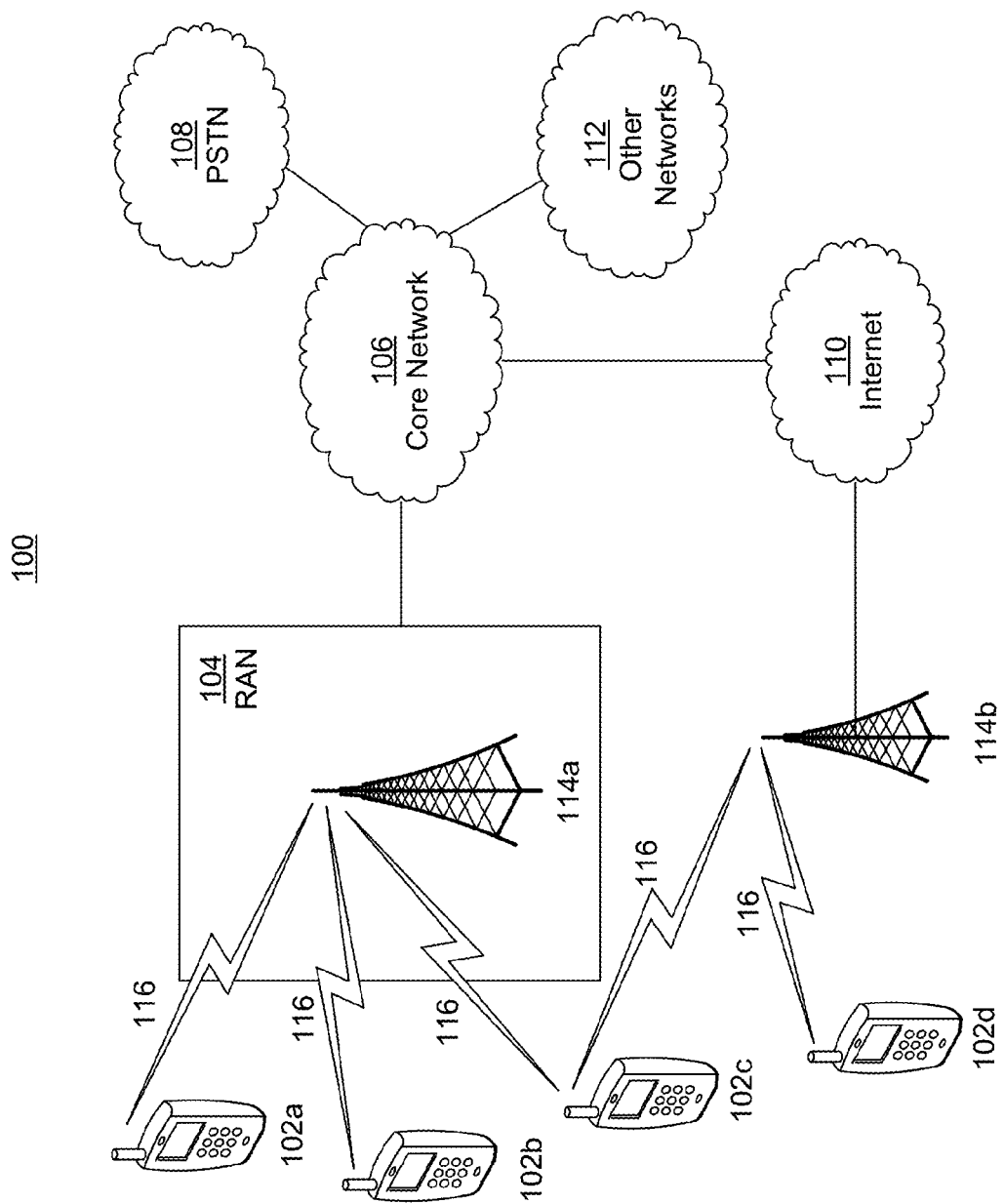
FIG. 41A is a system diagram of an example communications system in which one or more disclosed embodiments may be implemented.

FIG. 41A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 41A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 41A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 41A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 41A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 41A may be configured to communicate with the base station 114a, which may employ a cellular-based radio technology, and with the base station 114b, which may employ an IEEE 802 radio technology.

Figure 41B:
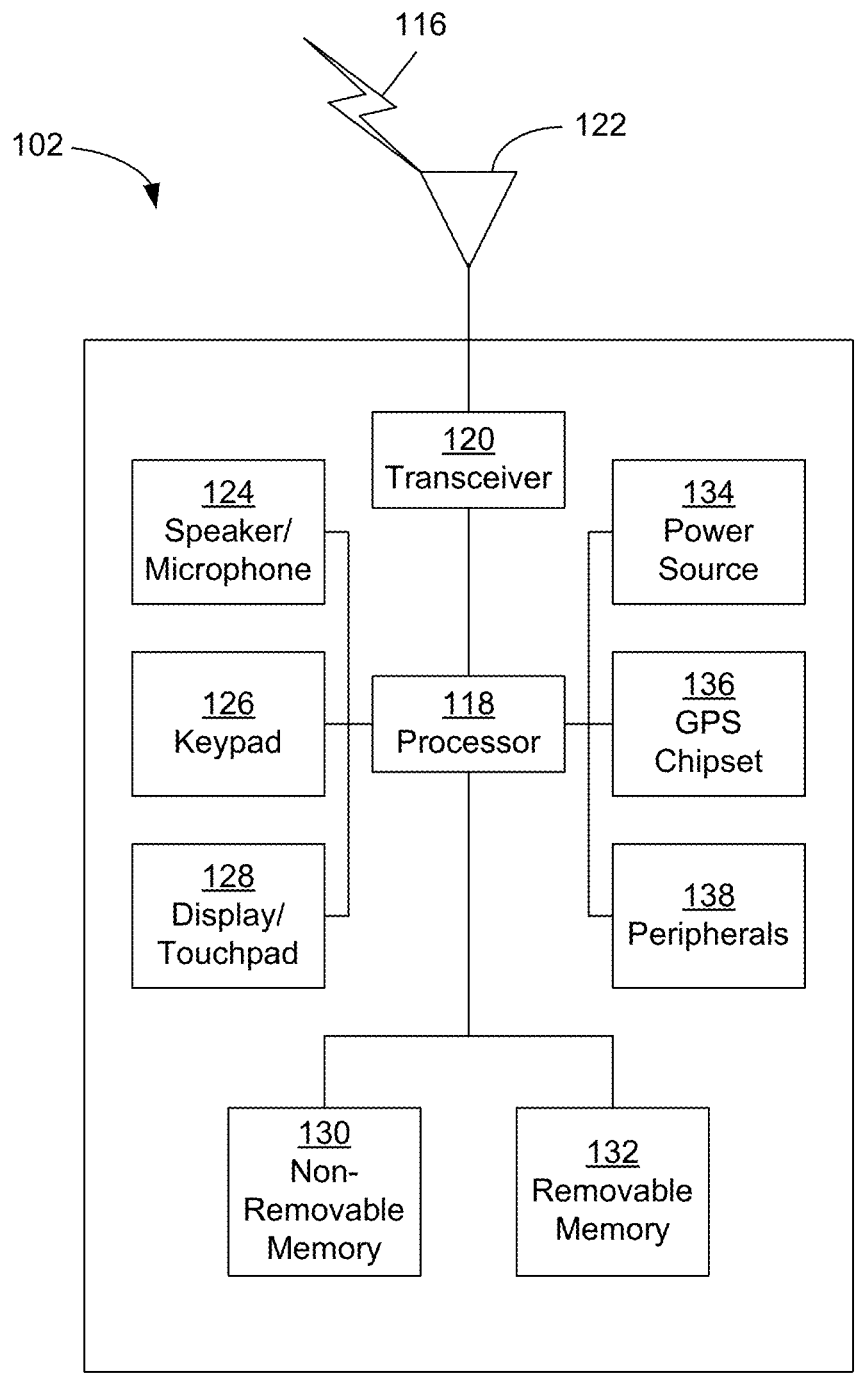
FIG. 41B is a system diagram of an example wireless transmit/receive unit (WTRU) that may be used within the communications system illustrated in FIG. 41A.

FIG. 41B is a system diagram of an example WTRU 102. As shown in FIG. 41B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 41B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 41B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 41C:
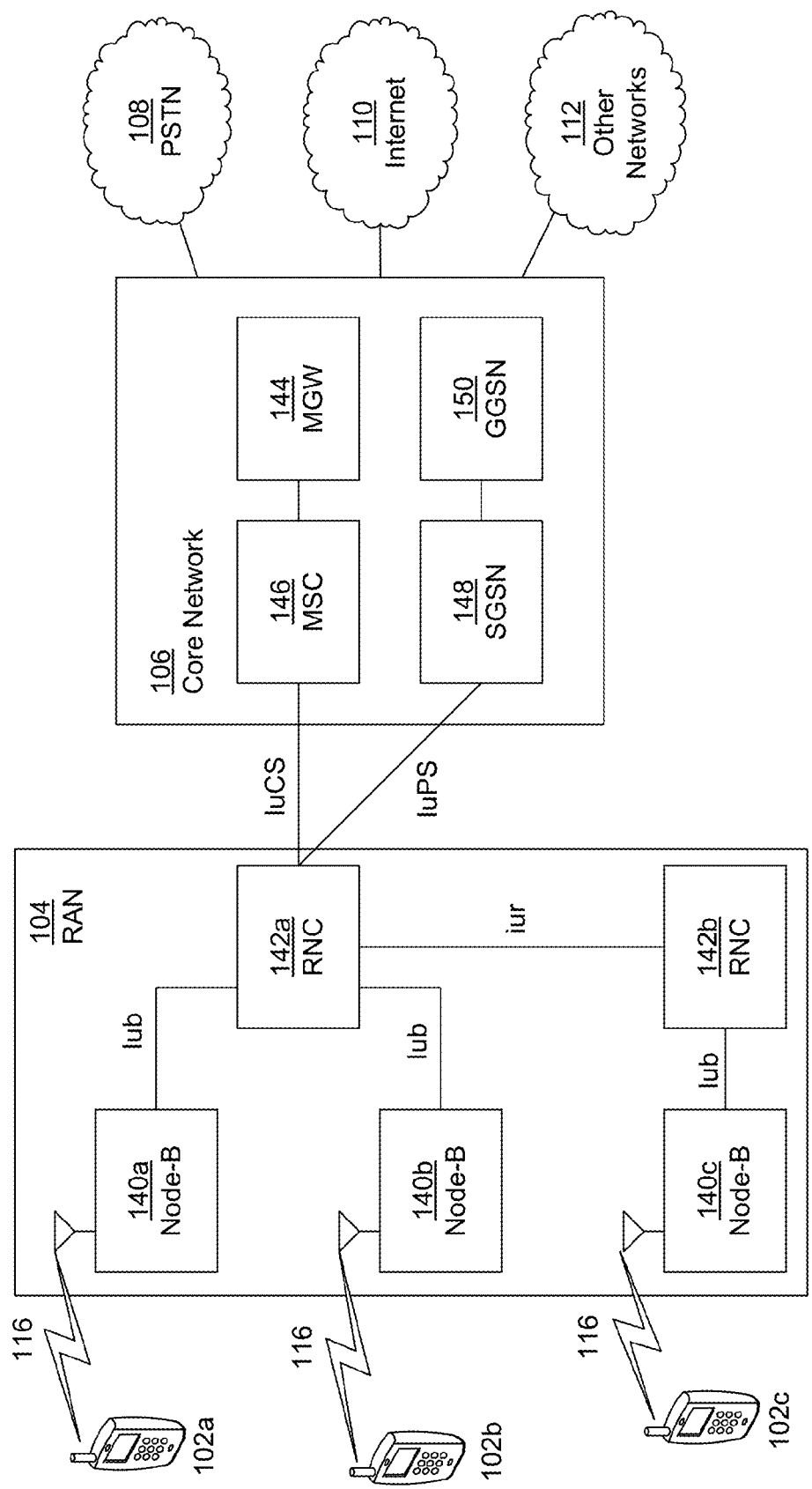
FIGS. 41C-41E are system diagrams of an example radio access networks and example core networks that may be used within the communications system illustrated in FIG. 41A.

FIG. 41C is a system diagram of the RAN 104 and the core network 106 according to an embodiment. As noted above, the RAN 104 may employ a UTRA radio technology to communicate with the WTRUs 102a, 102b, and 102c over the air interface 116. The RAN 104 may also be in communication with the core network 106. As shown in FIG. 41C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 41C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 41C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 41D:
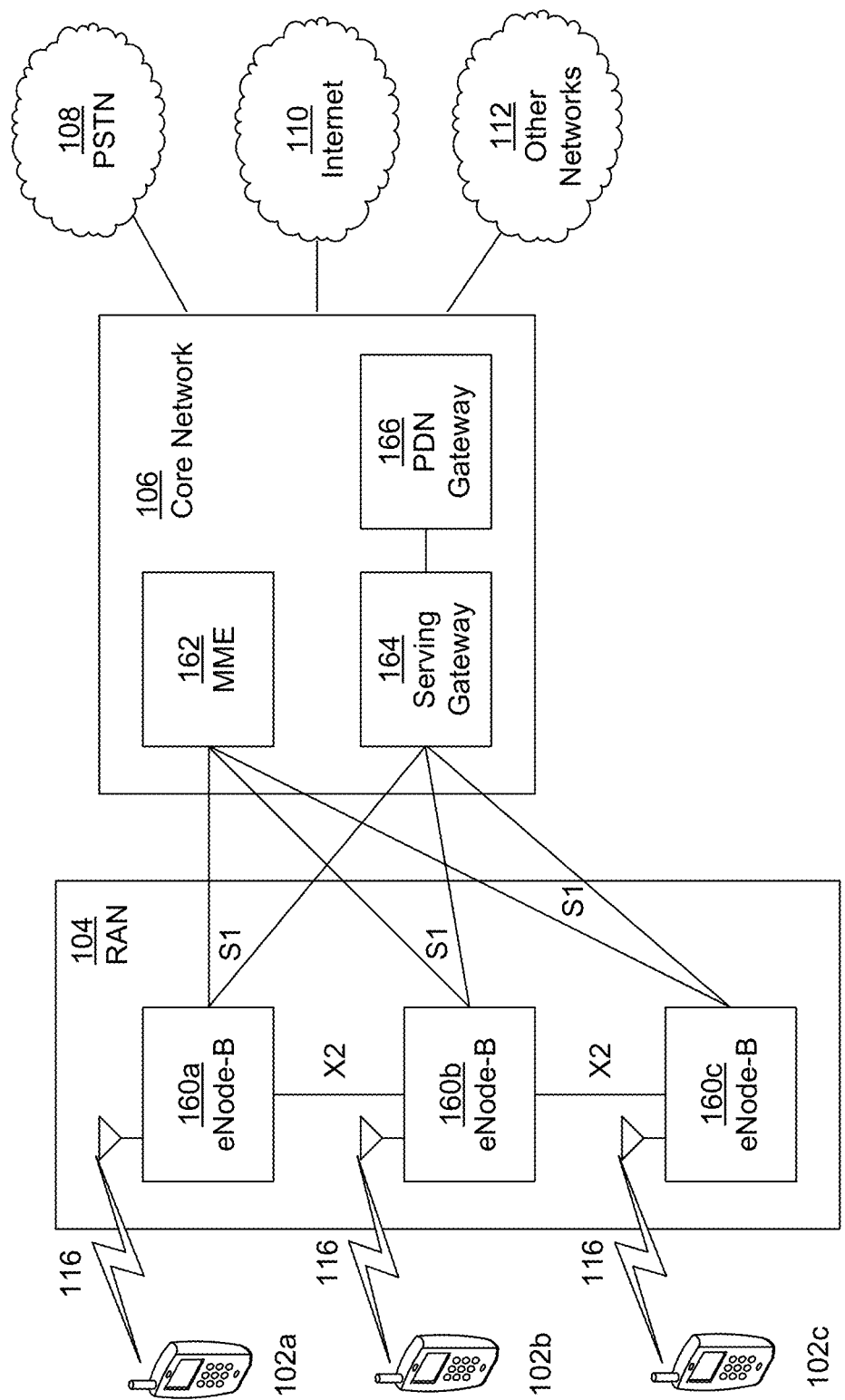

FIG. 41D is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 41D, the eNode-Bs 160a, 160b, 160c may communicate with one another over an X2 interface.

The core network 106 shown in FIG. 41D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 41E:
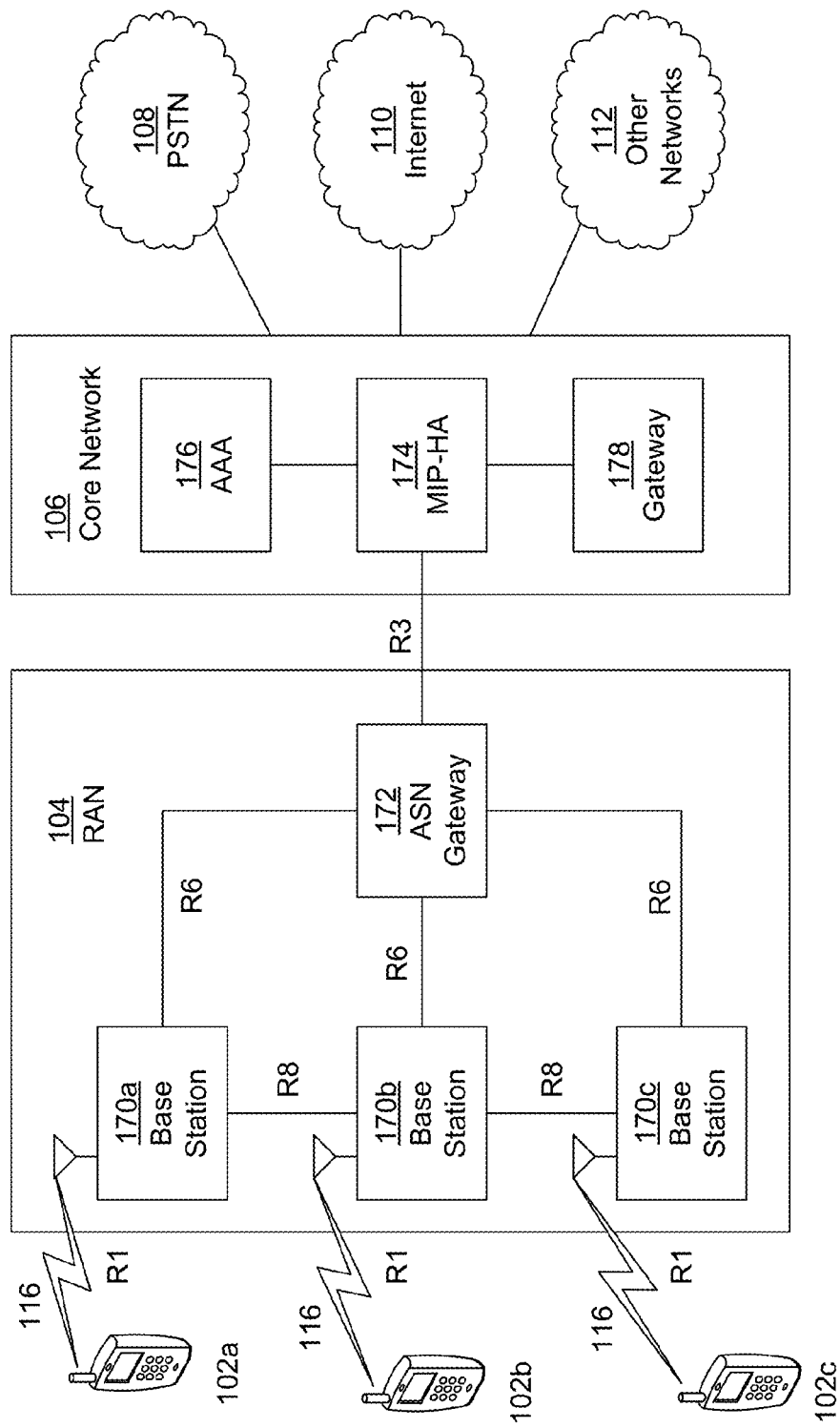

FIG. 41E is a system diagram of the RAN 104 and the core network 106 according to another embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 41E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 100c.

As shown in FIG. 41E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 41E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Experimental Results II

Figure 42:
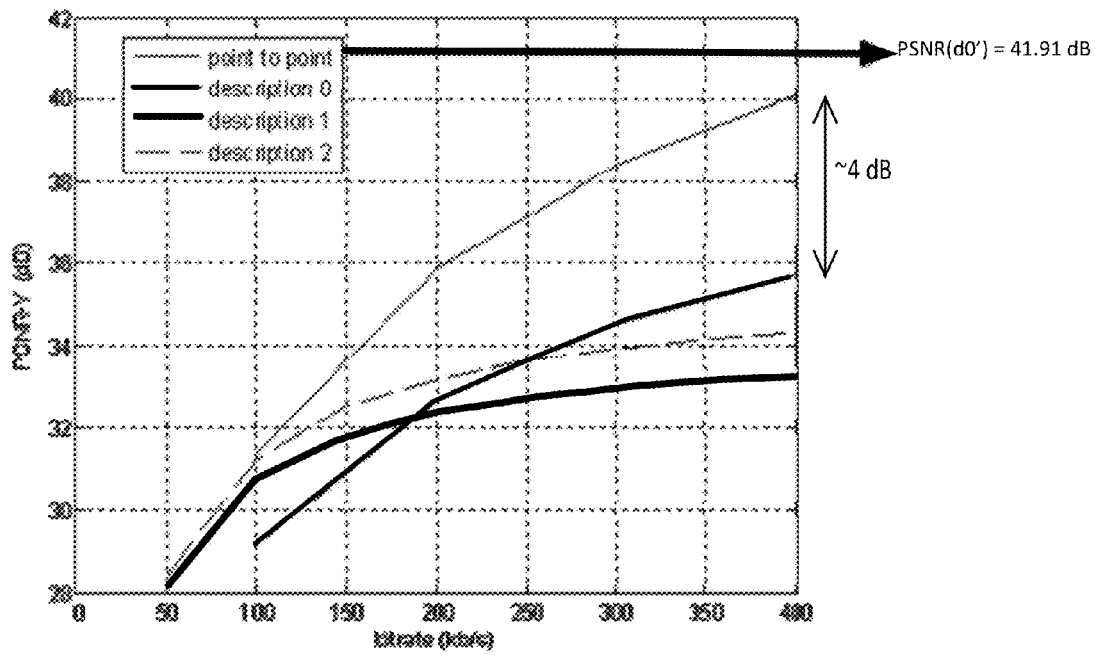
FIG. 42 is plot of rate-distortion performance of spatial MDC using quincunx sampling.
Figure 43:
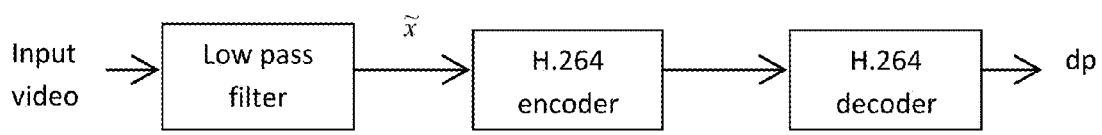
FIG. 43 is a block diagram of a point to point system for measuring PSNR as shown in FIG. 42.
Figure 44:
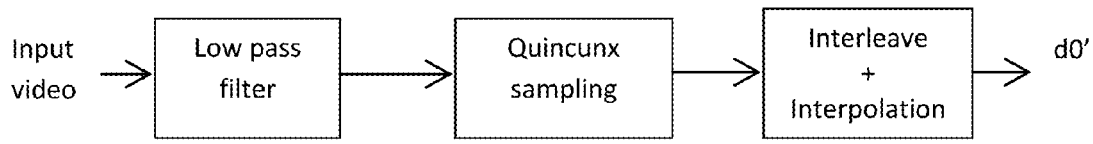
FIG. 44 is a block diagram of a point to point system for measuring PSNR for quincunx sampling and reconstruction without the encoding and decoding step.

Experiment A.1: Study of rate-distortion performance of Spatial MDC: the rate-distortion performance of spatial MDC using quincunx sub-sampling described above is examined. The Foreman test video at CIF resolution is used in the test. We encode the descriptions at different bitrates and decode them as shown in FIG. 13 and FIG. 14. The resulting RD plot is shown in FIG. 42. It should be noted that we measure PSNR using the low pass filtered video x̃ as reference, as shown in FIG. 43. The Point-to-point approach is shown in FIG. 43. To analyze the loss in PSNR due to quincunx sampling, we apply it to the low pass filtered video followed by interleaving and interpolation as shown in FIG. 44, and measure the PSNR of the output d0'. We find that PSNR of d0' ~42 dB, indicating that quincunx sampling does not significantly degrade video quality.

Figure 45:
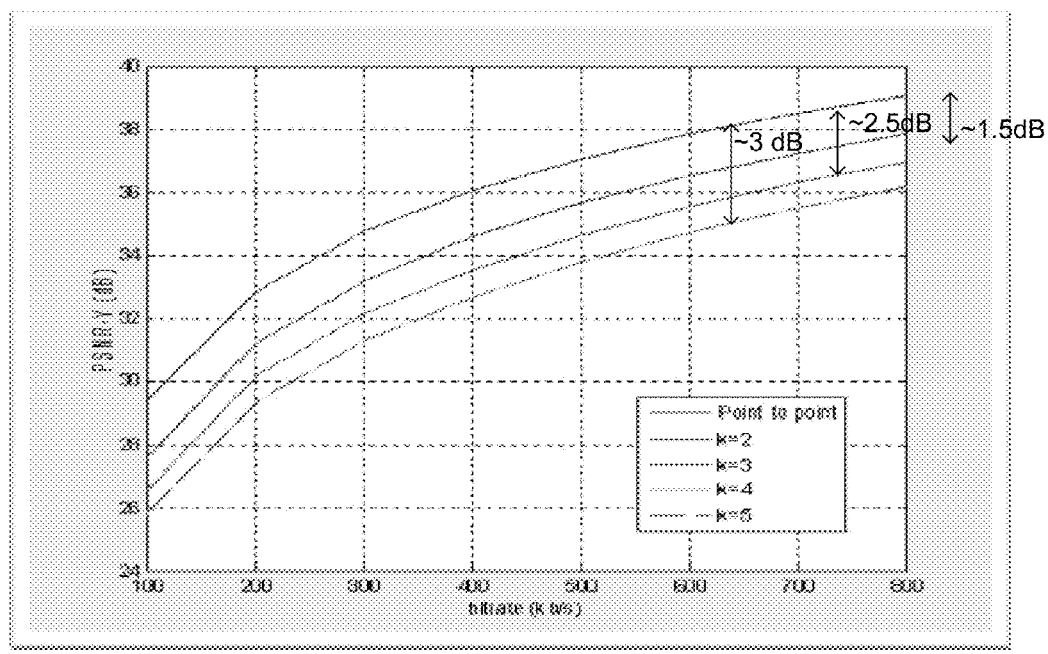
FIG. 45 is a plot showing rate-distortion performance of homogeneous temporal MDC for different numbers of descriptions.
Figure 46:
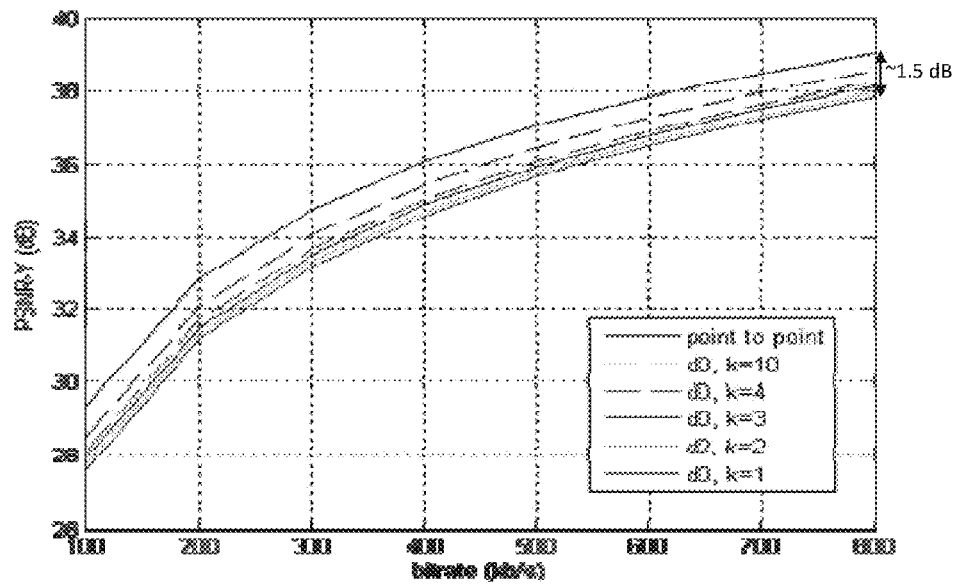
FIG. 46 is a plot showing rate-distortion performance of Inhomogeneous temporal MDC with 2 descriptions and different values of interleave factor k.

Experiment A.2: Study of rate-distortion performance of temporal MDC: We analyzed the rate-distortion (RD) performance of homogeneous and Inhomogeneous MDC by varying the parameter k. As mentioned earlier, parameter k (i.e., the interleaving factor) in Inhomogeneous temporal MDC corresponds to the length of the groups of consecutive frames. In homogeneous temporal MDC, m corresponds to the number of descriptions, where "point to point" refers to the single description case. For Inhomogeneous MDC, we set the number of descriptions to two and vary k. We use the x264 encoder to encode the descriptions at different bitrates, and provide the PSNR of description 0 (d0) vs. bit-rate in FIG. 45 and FIG. 46. From FIG. 45, we find that as k increases, PSNR of d0 decreases, indicating that using more descriptions affect the RD performance of d0. From FIG. 46, we find that in Inhomogeneous MDC as k increases PSNR improves. As longer group of frames (k) are used, overall prediction improves since most frames are predicted from temporally adjacent frames, thereby resulting in improved RD performance.

Reference Picture Handling in H.264

Figure 47:
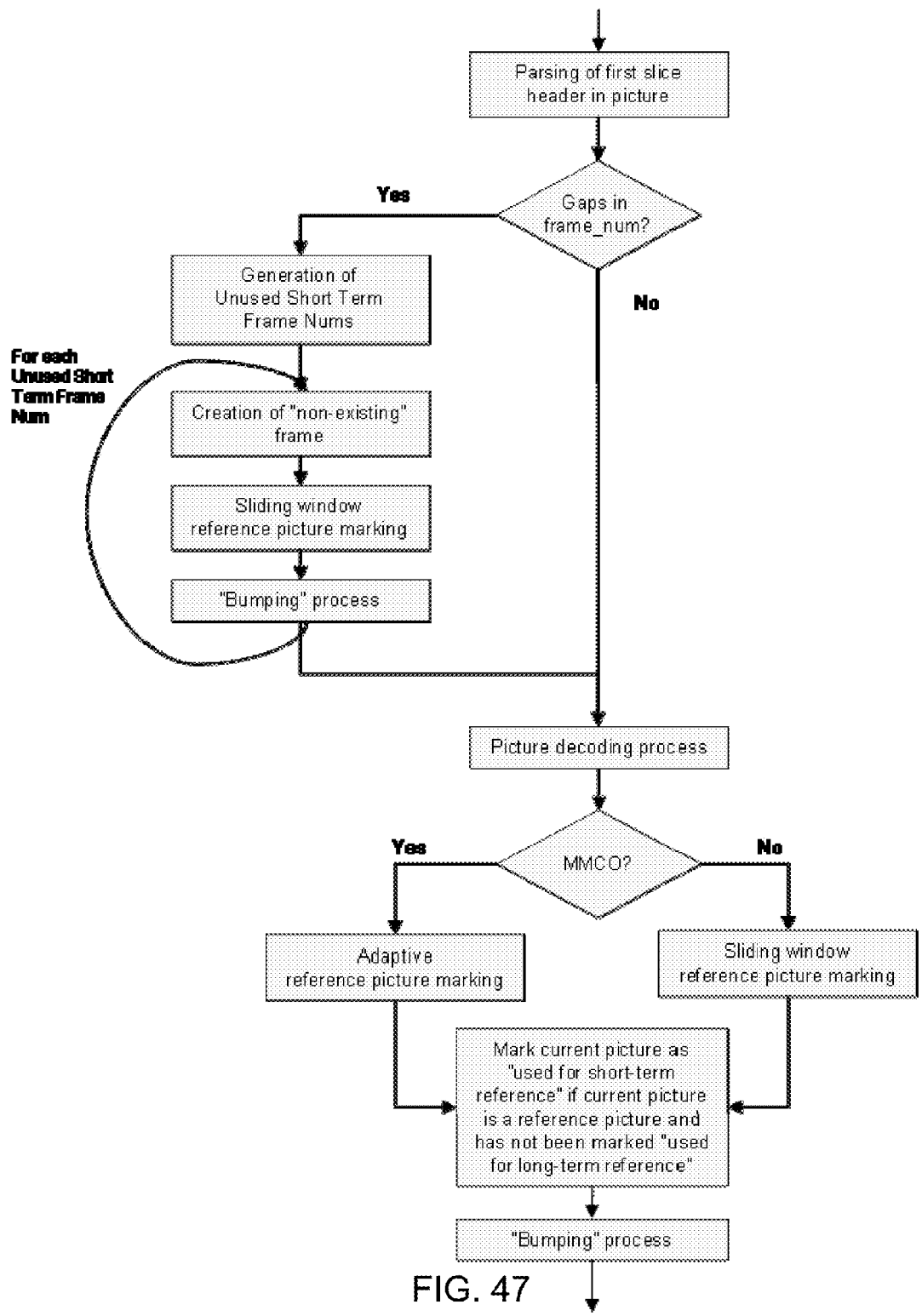
FIG. 47 is a flow chart showing one exemplary embodiment of reference picture handling and decoder buffer operation in an H.264 encoder; and, FIG. 48 depicts the H.264/AVC NAL Unit format.

H.264 reference picture management is shown in FIG. 47, and a table of Memory management control operation values from H.264/AVC is provided below:

| memory_management_control_operation | Memory Management Control Operation |
|---|---|
| 0 | End memory_management_control_operation syntax element loop |
| 1 | Mark a short-term reference picture as "unused for reference" |
| 2 | Mark a long-term reference picture as "unused for reference" |
| 3 | Mark a short-term reference picture as "used for long-term reference" and assign a long-term frame index to it |
| 4 | Specify the maximum long-term frame index and mark all long-term reference pictures having long-term frame indices greater than the maximum value as "unused for reference" |
| 5 | Mark all reference pictures as "unused for reference" and set the MaxLongTermFrameIdx variable to "no long-term frame indices" |
| 6 | Mark the current picture as "used for long-term reference" and assign a long-term frame index to it |

Packet Information in H.264

The output of an H.264 encoder is in the form of packets called NAL units. The table below (Table 7-1) is copied from the standard. Five bits are used to represent the type of a packet. At a high level, the classification is hierarchical:

VCL (compressed bits)

Non-IDR (Instantaneous Decoding Refresh) slice, nal_unit_type=1

IDR slice, nal_unit_type=5

. . .

non-VCL (extra info)

Sequence Parameter set

. . .

For VCL, since some information (e.g., macroblock types, motion vectors) in a coded slice is more important than other information, a slice can be optionally partitioned into one of the following three types:

Partition A (nal_unit_type=2): slice header partition, contains information such as macroblock types, quantization parameters, motion vectors Partition B (nal_unit_type=3): intra partition, contains intra Coded Block Patterns (CBP) and intra coefficients
Partition C (nal_unit_type=4): inter partition, contains only inter CBP and inter coefficients Partition A is most important. If Partition A is lost, the other partitions are useless. A summary of the H.264 NAL Unit format is shown in FIG. 48.

TABLE 7-1

NAL unit type codes, syntax element categories, and NAL unit type classes

| nal_unit_type | Content of NAL unit and RBSP syntax structure | C | Annex A NAL unit type class | Annex G NAL unit type class |
|---|---|---|---|---|
| 0 | Unspecified | | non-VCL | non-VCL |
| 1 | Coded slice of a non-IDR picture slice_layer_without_partitioning_rbsp( ) | 2, 3, 4 | VCL | VCL |
| 2 | Coded slice data partition A slice_data_partition_a_layer_rbsp( ) | 2 | VCL | not applicable |
| 3 | Coded slice data partition B slice_data_partition_b_layer_rbsp( ) | 3 | VCL | not applicable |
| 4 | Coded slice data partition C slice_data_partition_c_layer_rbsp( ) | 4 | VCL | not applicable |
| 5 | Coded slice of an IDR picture slice_layer_without_partitioning_rbsp( ) | 2, 3 | VCL | VCL |
| 6 | Supplemental enhancement information (SEI) sei_rbsp( ) | 5 | non-VCL | non-VCL |
| 7 | Sequence parameter set seq_parameter_set_rbsp( ) | 0 | non-VCL | non-VCL |
| 8 | Picture parameter set pic_parameter_set_rbsp( ) | 1 | non-VCL | non-VCL |
| 9 | Access unit delimiter access_unit_delimiter_rbsp( ) | 6 | non-VCL | non-VCL |
| 10 | End of sequence end_of_seq_rbsp( ) | 7 | non-VCL | non-VCL |
| 11 | End of stream end_of_stream_rbsp( ) | 8 | non-VCL | non-VCL |
| 12 | Filler data filler_data_rbsp( ) | 9 | non-VCL | non-VCL |
| 13 | Sequence parameter set extension seq_parameter_set_extension_rbsp( ) | 10 | non-VCL | non-VCL |
| 14 | Prefix NAL unit in scalable extension prefix_nal_unit_rbsp( ) /* specified in Annex G */ | 2 | non-VCL | suffix dependent |
| 15 | Subset sequence parameter set subset_seq_parameter_set_rbsp( ) /* specified in Annex G */ | 0 | non-VCL | non-VCL |
| 16 ... 18 | Reserved | | non-VCL | non-VCL |
| 19 | Coded slice of an auxiliary coded picture without partitioning slice_layer_without_partitioning_rbsp( ) | 2, 3, 4 | non-VCL | non-VCL |
| 20 | Coded slice in scalable extension slice_layer_in_scalable_extension_rbsp( ) /* specified in Annex G */ | 2, 3, 4 | non-VCL | VCL |
| 21 ... 23 | Reserved | | non-VCL | non-VCL |
| 24 ... 31 | Unspecified | | non-VCL | non-VCL |

Embodiments

In one embodiment, a method is implemented comprising encoding input video data using inhomogeneous temporal Multiple Description Coding (IHTMDC).

In accordance with this embodiment, the method may further comprise: wherein the input video data comprises a plurality of sequential frames and wherein frames contained in at least one description comprise temporally inhomogeneously distributed frames of the input video data.

One or more of the preceding embodiments may further comprise: wherein the encoding scheme is further characterized by an interleave factor, k, wherein k is a number of consecutive frames of the input video data between gaps in consecutive frames in a description.

One or more of the preceding embodiments may further comprise: wherein k is in the range of 3 to 8.

One or more of the preceding embodiments may further comprise: wherein k is varied over time by the encoder.

One or more of the preceding embodiments may further comprise: wherein k is varied as a function of a condition of a transmission channel of the video descriptions.

One or more of the preceding embodiments may further comprise: wherein k is varied as a function of packet loss rate (PLR).

One or more of the preceding embodiments may further comprise: wherein k is selected to minimize the sum of quantization distortion and transmission distortion.

One or more of the preceding embodiments may further comprise: wherein k is not equal for all of the descriptions.

One or more of the preceding embodiments may further comprise: using feedback-based error correction.

The method of claim 10 wherein the feedback-based error correction comprises an error concealment technique.

One or more of the preceding embodiments may further comprise: using a feedback-based error propagation reduction process.

One or more of the preceding embodiments may further comprise: wherein the error propagation reduction process includes generating an Intra Refresh frame.

One or more of the preceding embodiments may further comprise: wherein the error propagation reduction process includes generating encoded video using a reference picture selection (RPS) method.

One or more of the preceding embodiments may further comprise: wherein the error propagation reduction process includes generating encoded video using a reference set of pictures selection (RSPS) method.

One or more of the preceding embodiments may further comprise: wherein the error propagation reduction process includes generating encoded video using one or more reference pictures selected based on the video packet loss data.

One or more of the preceding embodiments may further comprise: wherein an H.264 encoder is used to generate the descriptions and wherein the descriptions are H.264 standard compliant.

One or more of the preceding embodiments may further comprise: wherein two instances of an H.264 encoder are used.

In another embodiment, a video encoding method comprises: sub-sampling input video, the input video comprising a plurality of sequential frames, to generate at least first and second video streams, each stream comprising different frames of the input video; and encoding each of the at least first and second video streams to generate at least first and second video descriptions; wherein the frames contained in at least one of the video streams comprises temporally inhomogeneous frames of the input video.

One or more of the preceding embodiments may further comprise: wherein the encoding is performed by at least one H.264 encoder.

One or more of the preceding embodiments may further comprise: transmitting video packets of the at least first and second descriptions over separate RTP channels.

One or more of the preceding embodiments may further comprise: transmitting video packets of the at least first and second descriptions over the same RTP channel.

One or more of the preceding embodiments may further comprise: receiving error feedback identifying lost video data in the first description; and responsive to receipt of error feedback, using an error propagation reduction technique to reduce error propagation in the first description.

One or more of the preceding embodiments may further comprise: wherein the error propagation reduction technique comprises Intra/IDR refresh.

One or more of the preceding embodiments may further comprise: wherein the Intra/IDR refresh comprises encoding a frame as an I frame or IDR frame.

One or more of the preceding embodiments may further comprise: wherein the error propagation reduction technique comprises a reference picture selection (RPS) technique.

One or more of the preceding embodiments may further comprise: wherein the RPS technique comprises encoding a frame as a P frame using prediction from a frame prior to the lost frame.

One or more of the preceding embodiments may further comprise: wherein the RPS technique comprises encoding a frame as a P frame using prediction from a frame in the second description preceding the lost frame.

One or more of the preceding embodiments may further comprise: wherein the frame in the second description used for prediction of the P frame in the first description comprises the temporally nearest preceding frame in the second description that was confirmed via feedback as having been correctly received.

One or more of the preceding embodiments may further comprise: wherein the frame in the second description used for prediction of the P frame in the first description comprises a frame in the second description that is temporally nearest to the lost frame.

One or more of the preceding embodiments may further comprise: wherein the encoding scheme is further characterized by an interleave factor, k, wherein k is a number of consecutive frames of an original video signal between gaps in consecutive frames in a description.

One or more of the preceding embodiments may further comprise: wherein k is in the range of 3 to 8.

One or more of the preceding embodiments may further comprise: wherein k is varied over time by the encoder.

One or more of the preceding embodiments may further comprise: wherein k is varied as a function of a condition of a transmission channel of the video descriptions.

One or more of the preceding embodiments may further comprise: wherein k is varied as a function of packet loss rate (PLR).

One or more of the preceding embodiments may further comprise: wherein k is varied as a function of quantization distortion.

One or more of the preceding embodiments may further comprise: wherein k is not equal for all of the descriptions.

In another embodiment, a multiple description coding (MDC) video decoding method comprises: receiving at least first and second video descriptions, each description comprising different temporal portions of an input video, wherein the frames contained in at least one of the descriptions comprises temporally inhomogeneous temporal portions of the input video; decoding the at least first and second descriptions; and, when the at least first and second descriptions are received correctly, multiplexing the at least first and second descriptions to create a reproduction of the input video.

One or more of the preceding embodiments may further comprise, when at least one but less than all of the at least first and second descriptions are received correctly, frame rate upconverting at least one of the correctly received descriptions to create a reproduction of the input video.

One or more of the preceding embodiments may further comprise transmitting feedback data responsive to receipt of the at least first and second descriptions indicating whether video data in the at least first and second descriptions has been received correctly.

One or more of the preceding embodiments may further comprise using feedback-based error correction.

One or more of the preceding embodiments may further comprise: wherein the feedback-based error correction comprises an error concealment technique.

One or more of the preceding embodiments may further comprise: wherein the error concealment technique comprises predicting video data subsequent to lost video data in the first description from video data in the first description preceding the lost video data.

One or more of the preceding embodiments may further comprise: wherein the error concealment technique comprises predicting video data subsequent to the lost video data in the first description from decoded video data in the second description.

One or more of the preceding embodiments may further comprise: wherein the video data in the second description used to predict the video data subsequent to the lost video data in the first description comprises data from the nearest temporally adjacent temporal portion in the second description preceding the lost temporal portion in the first description.

One or more of the preceding embodiments may further comprise: wherein the error concealment technique comprises discarding the lost video data and replacing it with temporally adjacent video data from the second description.

One or more of the preceding embodiments may further comprise: wherein the feedback-based error correction comprises using an error propagation reduction technique to reduce error propagation in the first description.

One or more of the preceding embodiments may further comprise: wherein the error propagation reduction technique comprises an Intra/IDR refresh technique.

One or more of the preceding embodiments may further comprise: wherein the error propagation reduction technique comprises a reference picture reset (RPS) technique.

One or more of the preceding embodiments may further comprise: wherein the decoding scheme is further characterized by an interleave factor, k, wherein k is a number of consecutive frames of an original video signal frame sequence contained in a description between gaps in the original video frame sequence.

One or more of the preceding embodiments may further comprise: wherein k is in the range of 3 to 8.

One or more of the preceding embodiments may further comprise: wherein k is varied over time by the encoder.

One or more of the preceding embodiments may further comprise: wherein k is varied as a function of a condition of a transmission channel of the video descriptions.

One or more of the preceding embodiments may further comprise: wherein k is varied as a function of packet loss rate (PLR).

One or more of the preceding embodiments may further comprise: wherein k is varied as a function of quantization distortion.

One or more of the preceding embodiments may further comprise at least three descriptions and wherein k is not same for all of the descriptions.

One or more of the preceding embodiments may further comprise: wherein the decoding is performed by at least one H.264 decoder.

One or more of the preceding embodiments may further comprise: wherein the decoding is performed by a separate H.264 decoder for each of the at least first and second descriptions.

One or more of the preceding embodiments may further comprise receiving the at least first and second descriptions over separate RTP channels.

One or more of the preceding embodiments may further comprise receiving the at least first and second descriptions over the same RTP channel.

In another embodiment, a method for encoding video data comprises temporally and spatially sub-sampling input video data to produce at least first, second, third, and fourth temporally and spatially sub-sampled video streams; and encoding each of the first, second, third, and fourth video streams to produce first, second, third, and fourth video descriptions.

One or more of the preceding embodiments may further comprise: wherein the spatial sub-sampling comprises quincunx spatial sub-sampling.

One or more of the preceding embodiments may further comprise: wherein the sub-sampling comprises temporally sub-sampling the input video data to produce first and second temporally sub-sampled video streams; and spatially sub-sampling each of the first and second temporally sub-sampled video streams to produce the first, second, third, and fourth temporally and spatially sub-sampled video streams.

One or more of the preceding embodiments may further comprise: wherein sub-sampled data in at least one of the descriptions comprises temporally inhomogeneous portions of the input video data.

One or more of the preceding embodiments may further comprise: wherein the encoding scheme is further characterized by an interleave factor, k, wherein k is a number of consecutive frames of an original video signal between gaps in consecutive frames in a description.

One or more of the preceding embodiments may further comprise: wherein k is in the range of 3 to 8.

One or more of the preceding embodiments may further comprise: wherein k is varied over time by the encoder.

One or more of the preceding embodiments may further comprise: wherein k is not the same for all of the descriptions.

In another embodiment, a method for decoding video data comprises: receiving first, second, third, and fourth temporally and spatially sub-sampled video descriptions of an input video; and decoding the first, second, third, and fourth video streams to produce first, second, third, and fourth video descriptions; and, when the first, second, third, and fourth descriptions are received correctly, multiplexing the first, second, third, and fourth descriptions to create a reproduction of the input video.

One or more of the preceding embodiments may further comprise: wherein the spatial sub-sampling comprises quincunx spatial sub-sampling.

One or more of the preceding embodiments may further comprise: wherein sub-sampled data in at least one of the descriptions comprises temporally inhomogeneous portions of the input video data.

The method of claim 67 wherein the decoding scheme is further characterized by an interleave factor, k, wherein k is a number of consecutive frames of an original video signal between gaps in consecutive frames in a description.

One or more of the preceding embodiments may further comprise: wherein k is in the range of 3 to 8.

One or more of the preceding embodiments may further comprise, when less than all of the first, second, third, and fourth descriptions are received correctly, interpolating and/or frame rate upconverting the data contained in any correctly received descriptions to generate an estimate of the incorrectly received description to create a reproduction of the input video.

One or more of the preceding embodiments may further comprise a video encoder comprising a processor adapted to encode video data using inhomogeneous temporal Multiple Description Coding (IHTMDC).

One or more of the preceding embodiments may further comprise: wherein sub-sampled data in at least one of the descriptions comprises temporally inhomogeneous portions of the input video data.

One or more of the preceding embodiments may further comprise: wherein the encoding scheme is further characterized by an interleave factor, k, wherein k is a number of consecutive frames of an original video signal between gaps in consecutive temporal portions of the video data in a description.

One or more of the preceding embodiments may further comprise: wherein the processor is further adapted to use feedback-based error correction.

One or more of the preceding embodiments may further comprise: wherein the feedback-based error correction comprises error concealment techniques.

One or more of the preceding embodiments may further comprise: using a feedback-based error propagation reduction process.

One or more of the preceding embodiments may further comprise an H.264 encoder.

One or more of the preceding embodiments may further comprise: wherein the H.264 encoder comprises at least first and second H.264 encoders.

One or more of the preceding embodiments may further comprise a video encoding apparatus comprising: a temporal sub-sampling circuit for processing an input video comprising a plurality of sequential frames to generate at least first and second video streams, each stream comprising different temporal portions of the input video; and a video encoder for encoding each of the at least first and second video streams to generate at least first and second video descriptions; wherein sub-sampled data in at least one of the descriptions comprises temporally inhomogeneous portions of the input video data.

One or more of the preceding embodiments may further comprise: wherein the video encoder is an H.264 encoder.

One or more of the preceding embodiments may further comprise a processor adapted to receive feedback identifying lost video data in the first description at a receiver; and responsive to receipt of feedback identifying lost video data in the first description, implement an error propagation reduction technique to reduce error propagation in the first description at the receiver.

One or more of the preceding embodiments may further comprise: wherein the error propagation reduction technique comprises an Intra/IDR refresh technique.

One or more of the preceding embodiments may further comprise: wherein the error propagation reduction technique comprises a reference picture reset (RPS) technique.

One or more of the preceding embodiments may further comprise: wherein the RPS technique comprises encoding a frame, after receipt of the feedback identifying lost video data in the first description, as a P frame using prediction from a frame in the second description preceding the lost frame.

One or more of the preceding embodiments may further comprise: wherein the frame in the second description used for prediction of the P frame in the first description comprises the temporally nearest preceding frame in the second description that was confirmed via feedback as having been correctly received at the receiver.

One or more of the preceding embodiments may further comprise: wherein the frame in the second description used for prediction of the P frame in the first description comprises a frame in the second description that is temporally nearest to the lost frame.

One or more of the preceding embodiments may further comprise: wherein the encoding scheme is further characterized by an interleave factor, k, wherein k is a number of consecutive frames of the input video signal between gaps in consecutive frames of the input video signal in a description.

One or more of the preceding embodiments may further comprise: wherein k is in the range of 3 to 8.

One or more of the preceding embodiments may further comprise: wherein k is varied over time.

One or more of the preceding embodiments may further comprise a multiple description coding (MDC) video decoding apparatus comprising: a decoder for decoding at least first and second video descriptions, each description comprising different frames of an input video, wherein at least one of the descriptions comprises temporally inhomogeneous portions of the input video; and a multiplexer adapted to, when the at least first and second descriptions are received correctly, multiplex the at least first and second descriptions to create a reproduction of the input video.

One or more of the preceding embodiments may further comprise a frame rate up-converter circuit adapted to, when at least one, but less than all, of the at least first and second descriptions are received correctly, frame rate upconvert at least one of the correctly received descriptions to create a reproduction of the input video.

One or more of the preceding embodiments may further comprise a processor for generating feedback data responsive to receipt of the at least first and second descriptions indicating whether video data in the at least first and second descriptions has been received correctly.

One or more of the preceding embodiments may further comprise a processor adapted to use feedback-based error correction.

One or more of the preceding embodiments may further comprise: wherein the feedback-based error correction comprises error concealment techniques.

One or more of the preceding embodiments may further comprise: wherein the error concealment technique comprises predicting video data subsequent to the lost video data in the first description from video data in the first description preceding the lost video data.

One or more of the preceding embodiments may further comprise: wherein the error concealment technique comprises predicting video data subsequent to the lost video data in the first description from decoded video data in the second description.

One or more of the preceding embodiments may further comprise: wherein the video data in the second description used to predict the video data subsequent to the lost video data in the first description comprises data from the nearest temporally adjacent frame in the second description preceding the lost frame in the first description.

One or more of the preceding embodiments may further comprise: wherein the error concealment technique comprises discarding the lost video data and replacing it with temporally adjacent video data from the second description.

One or more of the preceding embodiments may further comprise: wherein the feedback-based error correction comprises using an error propagation reduction technique to reduce error propagation in the first description.

One or more of the preceding embodiments may further comprise: wherein the error propagation reduction technique comprises an Intra/IDR refresh technique.

One or more of the preceding embodiments may further comprise: wherein the error propagation reduction technique comprises a reference picture reset (RPS) technique.

One or more of the preceding embodiments may further comprise: wherein the decoding scheme is further characterized by an interleave factor, k, wherein k is a number of consecutive frames of an original video signal between gaps in consecutive frames of the original video signal in a description.

One or more of the preceding embodiments may further comprise: wherein k is in the range of 3 to 8.

One or more of the preceding embodiments may further comprise: wherein k is varied over time by the encoder.

One or more of the preceding embodiments may further comprise: wherein k is varied as a function of a condition of a transmission channel of the video descriptions.

One or more of the preceding embodiments may further comprise: wherein k is varied as a function of packet loss rate (PLR).

One or more of the preceding embodiments may further comprise at least three descriptions and wherein k is not equal for all of the descriptions.

One or more of the preceding embodiments may further comprise a method for encoding video data comprising: temporally and spatially sub-sampling input video data to produce at least first, second, third, and fourth temporally and spatially sub-sampled video streams; and encoding each of the first, second, third, and fourth video streams to produce first, second, third, and fourth video descriptions.

One or more of the preceding embodiments may further comprise: wherein the spatial sub-sampling comprises quincunx spatial sub-sampling.

One or more of the preceding embodiments may further comprise wherein the sub-sampling comprises: temporally sub-sampling the input video data to produce first and second temporally sub-sampled video streams; and spatially sub-sampling each of the first and second temporally sub-sampled video streams to produce the first, second, third, and fourth temporally and spatially sub-sampled video streams.

One or more of the preceding embodiments may further comprise: wherein sub-sampled data in at least one of the descriptions comprises temporally inhomogeneous portions of the input video data.

One or more of the preceding embodiments may further comprise: wherein the encoding scheme is further characterized by an interleave factor, k, wherein k is a number of consecutive frames of an original video signal contained in a description between gaps in consecutive frames of the original video signal.

One or more of the preceding embodiments may further comprise: wherein k is in the range of 3 to 8.

One or more of the preceding embodiments may further comprise: wherein k is varied over time by the encoder.

One or more of the preceding embodiments may further comprise: wherein k is not equal for all of the descriptions.

One or more of the preceding embodiments may further comprise a method for decoding video data comprising: receiving first, second, third, and fourth temporally and spatially sub-sampled video descriptions of an input video; and decoding the first, second, third, and fourth descriptions; and, when the first, second, third, and fourth descriptions are received correctly, multiplexing the first, second, third, and fourth descriptions to create a reproduction of the input video.

One or more of the preceding embodiments may further comprise: wherein the spatial sub-sampling comprises quincunx spatial sub-sampling.

One or more of the preceding embodiments may further comprise: wherein sub-sampled data in at least one of the descriptions comprises temporally inhomogeneous portions of the input video.

One or more of the preceding embodiments may further comprise: wherein the decoding scheme is further characterized by an interleave factor, k, wherein k defines a number of consecutive frames of an original video signal contained in a description.

One or more of the preceding embodiments may further comprise, when less than all of the first, second, third, and fourth descriptions are received correctly, interpolating and/or frame rate upconverting the data contained in the correctly received descriptions to generate an estimate of the incorrectly received description to create a reproduction of the input video.

Conclusion

Various terms and abbreviations used herein may include the following:
ACK Acknowledgement
ARQ Automatic repeat request
eNodeB Base station
FMO Flexible macroblock ordering
IHTMDC Inhomogeneous temporal multiple description coding
I-frame Intra frame
IR Intra refresh
LTE 3GPP long term evolution
MAC Multiple access control
MDC Multiple description coding
MMCO Memory management control operation
NACK Non-acknowledgement
PDCP Packet data convergence protocol
PER Packet error rate
P-frame Prediction frame
PHY Physical layer
PSNR Peak signal-to-noise ratio
RLC Radio link control
RTCP Real-time transport control protocol
RTP Real-time transport protocol
UDP User datagram protocol
UE User equipment
UEP Uneven error protection Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus, and system described above are possible without departing from the scope of the invention. In view of the wide variety of embodiments that can be applied, it should be understood that the illustrated embodiments are exemplary only, and should not be taken as limiting the scope of the following claims.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

The following documents are incorporated herein by reference:

[1] H. Schulzrinne, S. Casner, R. Frederick, and V. Jacobsn. (July, 2003) RFC 3550. [Online]. http://tools.ietf.org/html/rfc3550
[2] J. Ott, S. Wenger, N. Sato, C. Burmeister, and J. Ray, IETF RFC 4585: "Extended RTP profile for real-time transport control protocol (RTCP)-based feedback (RTP/AVPF), 2006.
[3] ITU-T Recommendation H.271, Video back channel messages for conveyance of status information and requests from a video receiver to a video sender, May 2006.
[4] J. Devadoss, V. Singh, J. Ott, C. Liu, Y.-K. Wang, and I. Curcio, "Evaluation of Error Resilience Mechanisms for 3G Conversational Video," in *IEEE Intl Symposium on Multimedia*, 2008.
[5] B. Girod and N. Farber, "Feedback-based error control for mobile video transmission," *Proc. of IEEE*, vol. 97, pp. 1707-1723, October 1999.
[6] Iain E. G. Richardson, *H.264 and MPEG-4 Video Compression: Video Coding for Next-Generation Multimedia*: John Wiley & Sons, Ltd, 2004.
[7] V. K. Goyal, "Multiple description coding: compression meets the network," *IEEE Signal Proc. Magazine*, vol. 18, no. 5, pp. 74-93, September 2001.
[8] R. Bernardini, M. Durigon, R. Rinaldo, L. Celetto, and A. Vitali, "Polyphase spatial subsampling multiple description coding of video streams with H.264," in *Proceedings of ICIP*, October 2004, pp. 3213-3216.
[9] E. Beller and M. Van Der Schaar, "Multiple description coding video transmission using de-interlacing mechanisms," U.S. 2010/0033622 A1, Feb. 11, 2011.
[10] S. Wenger, "H.264/AVC over IP," *IEEE TCSVT*, vol. 13, pp. 645-656, July 2003.
[11] Fukunaga, S.; Nakai, T.; Inoue, H, "Error resilient video coding by dynamic replacing of reference pictures," in *GLOBECOM 1996*, 1996, pp. 1503-1508.
[12] W. Tu and E. G. Steinbach, "Proxy-Based Reference Picture Selection for Error Resilient Conversational Video in Mobile Networks," *IEEE Trans. CSVT*, vol. 19, no. 2, pp. 151-164, 2009.
[13] Rickard Sjöberg, Jonatan Samuelsson, "Absolute signaling of reference pictures," JCTVC-F493, 2011.
[14] S. Kumar, L. Xu, M. K. Mandal, S. Panchanathan, "Error resiliency schemes in H.264/AVC standard," *J. Visual Communication and Image Representation*, pp. 425-450, 2006.

What is claimed:

1. A video encoding method comprising:
sub-sampling input video, the input video comprising a plurality of sequential frames, to generate at least first and second video streams, each stream comprising different frames of the input video; and
encoding each of the at least first and second video streams to generate at least first and second video descriptions;
wherein the frames contained in at least one of the video streams comprises temporally inhomogeneous frames of the input video, wherein the temporal inhomogeneity is characterized by an interleave factor, k, wherein k is a number of consecutive frames of an original video signal between gaps in consecutive frames in a stream; and
wherein k is a function of quantization distortion.

2. The method of claim 1 further comprising:
receiving error feedback identifying lost video data in the first description; and
responsive to receipt of error feedback, using an error propagation reduction technique to reduce error propagation in the first description.

3. The method of claim 2 wherein the error propagation reduction technique comprises Intra/IDR refresh.

4. The method of claim 3 wherein the Intra/IDR refresh comprises:
encoding a frame as an I frame or IDR frame.

5. The method of claim 4 wherein the error propagation reduction technique comprises a reference picture selection (RPS) technique.

6. The method of claim 5 wherein the RPS technique comprises:
encoding a frame as a P frame using prediction from a frame prior to the lost frame.

7. The method of claim 6 wherein the RPS technique comprises:
encoding a frame as a P frame using prediction from a frame in the second description preceding the lost frame.

8. The method of claim 7 wherein the frame in the second description used for prediction of the P frame in the first description comprises the temporally nearest preceding frame in the second description that was confirmed via feedback as having been correctly received.

9. The method of claim 7 wherein the frame in the second description used for prediction of the P frame in the first description comprises a frame in the second description that is temporally nearest to the lost frame.

10. The method of claim 1 wherein k is varied over time by the encoder.

11. The method of claim 10 wherein k is varied as a function of a condition of a transmission channel of the video descriptions.

12. The method of claim 11 wherein k is varied as a function of packet loss rate (PLR).

13. The method of claim 1 wherein k is not equal for all of the descriptions.

* * * * *